US009767441B2

(12) United States Patent
Eleid et al.

(10) Patent No.: US 9,767,441 B2
(45) **Date of Patent: *Sep. 19, 2017**

(54) SYSTEM FOR MONITORING ELEVATORS AND MAINTAINING ELEVATORS

(71) Applicant: Xicore Inc., Mississauga (CA)

(72) Inventors: Ray Eleid, Mississauga (CA); Fransky Halim, Mississauga (CA)

(73) Assignee: Xicore Inc., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,336

(22) Filed: Feb. 22, 2016

(65) Prior Publication Data

US 2016/0171455 A1 Jun. 16, 2016

Related U.S. Application Data

(63) Continuation-in-part of application No. 14/514,260, filed on Oct. 14, 2014.

(51) Int. Cl.

| | |
|---|---|
| ***B66B 1/28*** | (2006.01) |
| ***G06Q 10/00*** | (2012.01) |
| ***G06F 3/0484*** | (2013.01) |
| ***G06Q 50/10*** | (2012.01) |

(52) U.S. Cl.

CPC ........... *G06Q 10/20* (2013.01); *G06F 3/0484* (2013.01); *G06Q 50/10* (2013.01)

(58) Field of Classification Search

CPC ....... G06Q 10/20; G06Q 50/13; G06F 3/0484

USPC ........ 187/247, 391, 393; 705/1.1, 13, 26.61, 705/304, 305; 709/220, 222, 224, 234; 702/183, 184; 706/910

See application file for complete search history.

(56) References Cited

U.S. PATENT DOCUMENTS

| | | | | |
|---|---|---|---|---|
| 5,884,035 | A * | 3/1999 | Butman | G06F 17/3089 707/999.01 |
| 6,330,936 | B1 * | 12/2001 | Lence Barreiro | B66B 5/0025 187/247 |
| 7,417,726 | B2 * | 8/2008 | Kao | B01L 3/50851 356/243.1 |
| 9,064,219 | B2 * | 6/2015 | Hall | G06Q 10/06 |
| 2004/0193518 | A1 * | 9/2004 | Deplazes | B66B 5/0025 705/34 |
| 2010/0058248 | A1 * | 3/2010 | Park | G06F 3/0481 715/851 |
| 2010/0286937 | A1 * | 11/2010 | Hedley | G06Q 30/02 702/60 |
| 2012/0072356 | A1 * | 3/2012 | Welty | G06Q 10/20 705/305 |
| 2013/0073260 | A1 * | 3/2013 | Maeda | G05B 23/0224 702/183 |

(Continued)

*Primary Examiner* — Anthony Salata

(74) *Attorney, Agent, or Firm* — Blake, Cassels & Graydon LLP; Wilfred P. So

(57) ABSTRACT

Systems and methods are provided for monitoring one or more lift devices, such as elevators and escalators. A server obtains code events about a lift device controller via a web services application. The code events are in a first format. The server reformats the code events into a second format using a mapping table, outputting reformatted code events. The server populates a graphical user interface (GUI) with the reformatted code events. The GUI is accessible by another computing device over the Internet.

32 Claims, 27 Drawing Sheets

(56) References Cited

U.S. PATENT DOCUMENTS

| | | | | | |
|---|---|---|---|---|---|
| 2013/0173062 | A1* | 7/2013 | Koenig-Richardson | G06Q 10/00 | 700/275 |
| 2014/0229335 | A1* | 8/2014 | Chen | G06Q 30/0269 | 705/26.61 |
| 2016/0010313 | A1* | 1/2016 | Sugiura | B60R 16/0234 | 701/29.4 |
| 2016/0012707 | A1* | 1/2016 | McKinley | G08B 25/10 | 340/679 |
| 2016/0104126 | A1* | 4/2016 | Eleid | G06Q 10/20 | 705/305 |

* cited by examiner

3-3_activities

| Column Name | Data Type |
|---|---|
| activity_id —— 102 | int |
| company_id —— 104 | int |
| location_id —— 106 | int |
| device_id —— 108 | int |
| activity_type | varchar(30) |
| work_description — 110 | varchar(250) |
| repair_description — 112 | varchar(250) |
| entered_date —— 114 | smalldatetime |
| completed_date — 116 | smalldatetime |
| work_order_number | varchar(20) |
| invoice_number — 120 | varchar(20) |
| estimated_cost — 122 | decimal(10,...) |
| actual_cost —— 124 | decimal(10,...) |
| callback_id —— 123 | int |
| directive_code  125 | varchar(10) |
| deficiency_number  126 | varchar(20) |
| government_mandated_code | varchar(10) |
| counter —— 128 | int  127 |
| billable —— 129 | bit |
| deleted | bit |
| deleted_by | int |
| deleted_when | smalldatetime |
| timeID | int |
| ContractID | int |

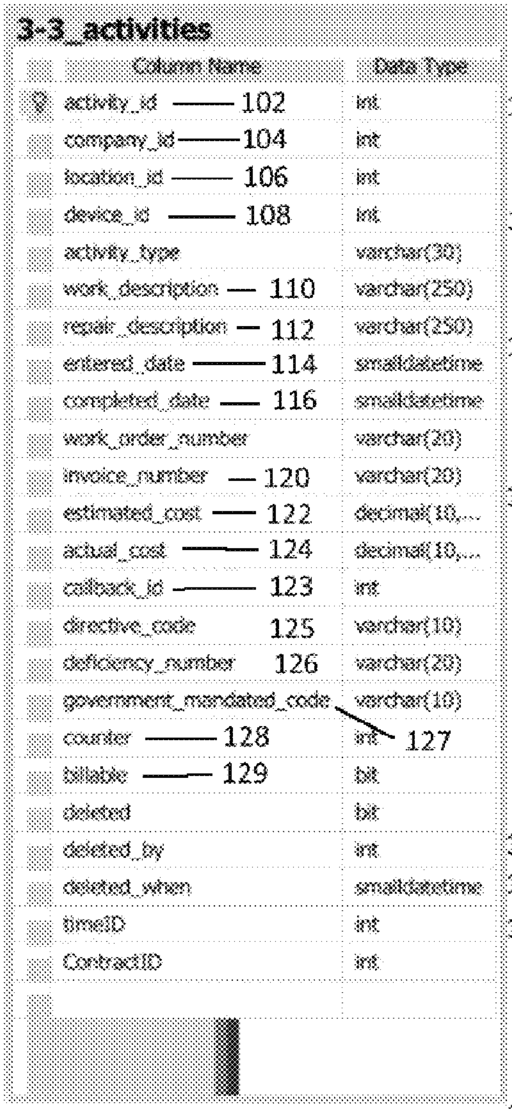

Fig. 8a

3-3_activity_labour

| Column Name | Data Type |
|---|---|
| 130 — activity_labour_id | int |
| activity_id — 102 | int |
| mechanic —— 132 | varchar(50) |
| 134 — time_ticket_number | varchar(20) |
| mechanic_rank | varchar(10) |
| bill_regular_hour | decimal(6, 2) |
| bill_half_hour | decimal(6, 2) |
| 136 — bill_overtime_hour | decimal(6, 2) |
| bill_travel_time | decimal(6, 2) |
| nonbill_regular_hour | decimal(8, 1) |
| nonbill_half_hour | decimal(8, 1) |
| 138 — nonbill_overtime_h... | decimal(8, 1) |
| nonbill_travel_time | decimal(8, 1) |
| activity_performed | varchar(250) |

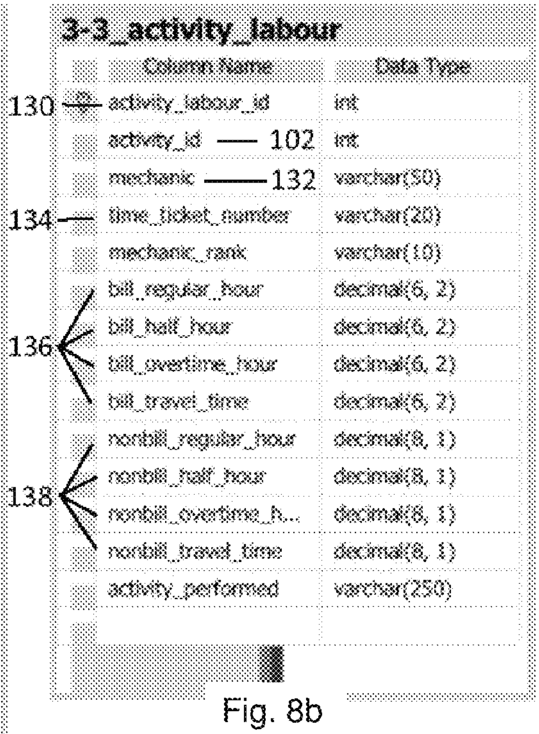

Fig. 8b

3-3_activity_parts

| Column Name | Data Type |
|---|---|
| 140 — activity_part_id | int |
| 130 — activity_labour_id | int |
| 102 — activity_id | int |
| SKU —— 142 | varchar(30) |
| OEM —— 144 | varchar(30) |
| non_OEM | varchar(30) |
| name —— 146 | varchar(50) |
| 148 — manufacturer | varchar(50) |
| 150 — quantity | smallint |
| 152 — description | varchar(100) |
| billable | bit |
| price —— 154 | decimal(8, 2) |

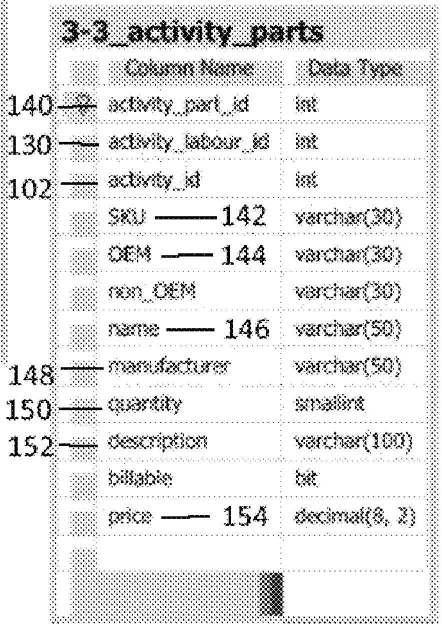

Fig. 8c

3-5_callbacks

| Column Name | Data Type |
|---|---|
| callback_id —— 156 | int |
| device_id —— 158 | int |
| salxcom_call_code - 160 | varchar(10) |
| call_code —— 162 | varchar(10) |
| company_callback_id 164 | varchar(20) |
| company_id —— 166 | int |
| entered_by ⎫ 168 | int |
| entered_from ⎭ | char(1) |
| date_the_problem_occurred | smalldateti... |
| call_description ⎫ 169 | varchar(250) |
| call_time ⎭ | smalldateti... |
| reported_by | varchar(50) |
| call_status | varchar(20) |
| call_close_time | varchar(10) |
| call_close_date | smalldateti... |
| entrapment | bit |
| dispatch_time —— 170 | smalldateti... |
| mechanic_arrive_time 172 | smalldateti... |
| billable_original —— 174 | bit |
| billable_current | bit |
| car_running | bit |
| updated_by ⎫ 176 | int |
| updated_when ⎭ | smalldateti... |
| mapped_to | int |
| deleted | bit |
| counter | int |
| ContractID | int |
| EmergencyType | nvarchar(50) |

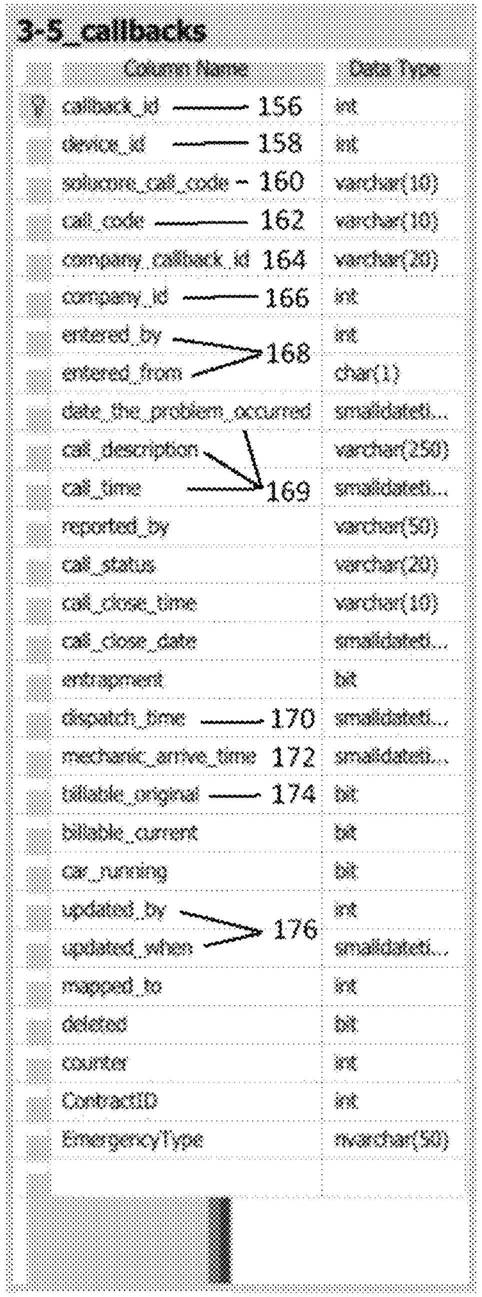

Fig. 9a

3-5_callbackTime

| Column Name | Data Type |
|---|---|
| 178 — timeID | int |
| 156 — callback_id | int |
| 170 — dispatch_time | smalldatetime |
| 172 — mechanic_arrive_ti... | smalldatetime |
| 180 — checked | int |
| note | nvarchar(250) |

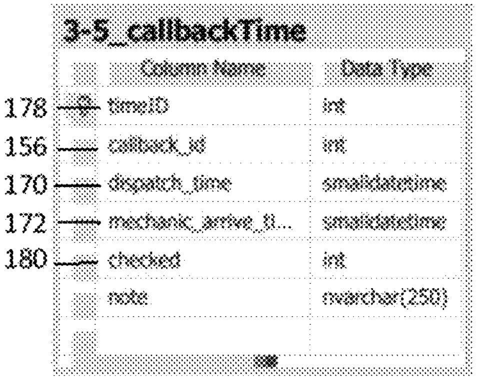

Fig. 9b

3-4_callCodes

| Column Name | Data Type |
|---|---|
| 162 — call_code | varchar(10) |
| 160 — salxcom_call_code | varchar(4) |
| 166 — company_id | int |
| 182 — part_name | varchar(100) |
| id | int |

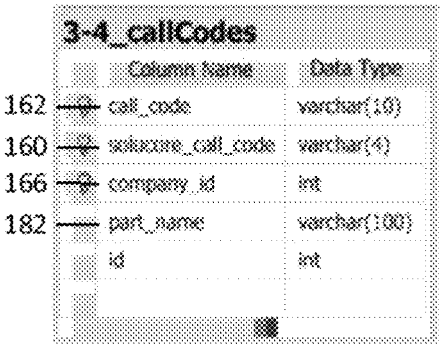

Fig. 9c

Sample of XML string being transmitted

```
<ArrayOfEventInfo xmlns:xsi="http://www.w3.org/2001/XMLSchema-instance"
xmlns:xsd="http://www.w3.org/2001/XMLSchema"
xmlns="http://www.mceinc.com/webservices/">
  <EventInfo>
185 <buildingid>1</buildingid>
186 <rowid>112545</rowid>
187 <manufacturerid>8</manufacturerid>
188 <dipatcherid>3</dispatcherid>
189 <carid>11</carid>
190 <car>North Parking</car>
192 <carid>11</carid>
193 <date>2014-06-11T16:04:59.33</date>
194 <EventId>805339135</EventId>
195 <floor>P3</floor>
196 <floorid>3</floorid>
    <confirmed>false</confirmed>
    <comment/>
  </EventInfo>
</ArrayOfEventInfo>
```

Fig. 10a

Data conversion

| Entity from XML string | Data Column in BuildingEvents table |
|---|---|
| buildingid | BuildingId |
| rowid | RowId |
| manufacturerid | ManufacturerId |
| dipatcherid | DispatcherId |
| carid | CarId |
| date | EventDate |
| eventid | EventId |
| floorid | FloorId |
| comment | Comment |

Fig. 10b

Building events table

BuildingEvents

| Column Name | Data Type |
|---|---|
| BuildingId | int |
| RowId | bigint |
| DispatcherId | int |
| CarId | smallint |
| FloorId | smallint |
| EventDate | smalldatetime |
| ManufacturerId | int |
| EventId | bigint |
| Comment | nvarchar(255) |

Fig. 10c

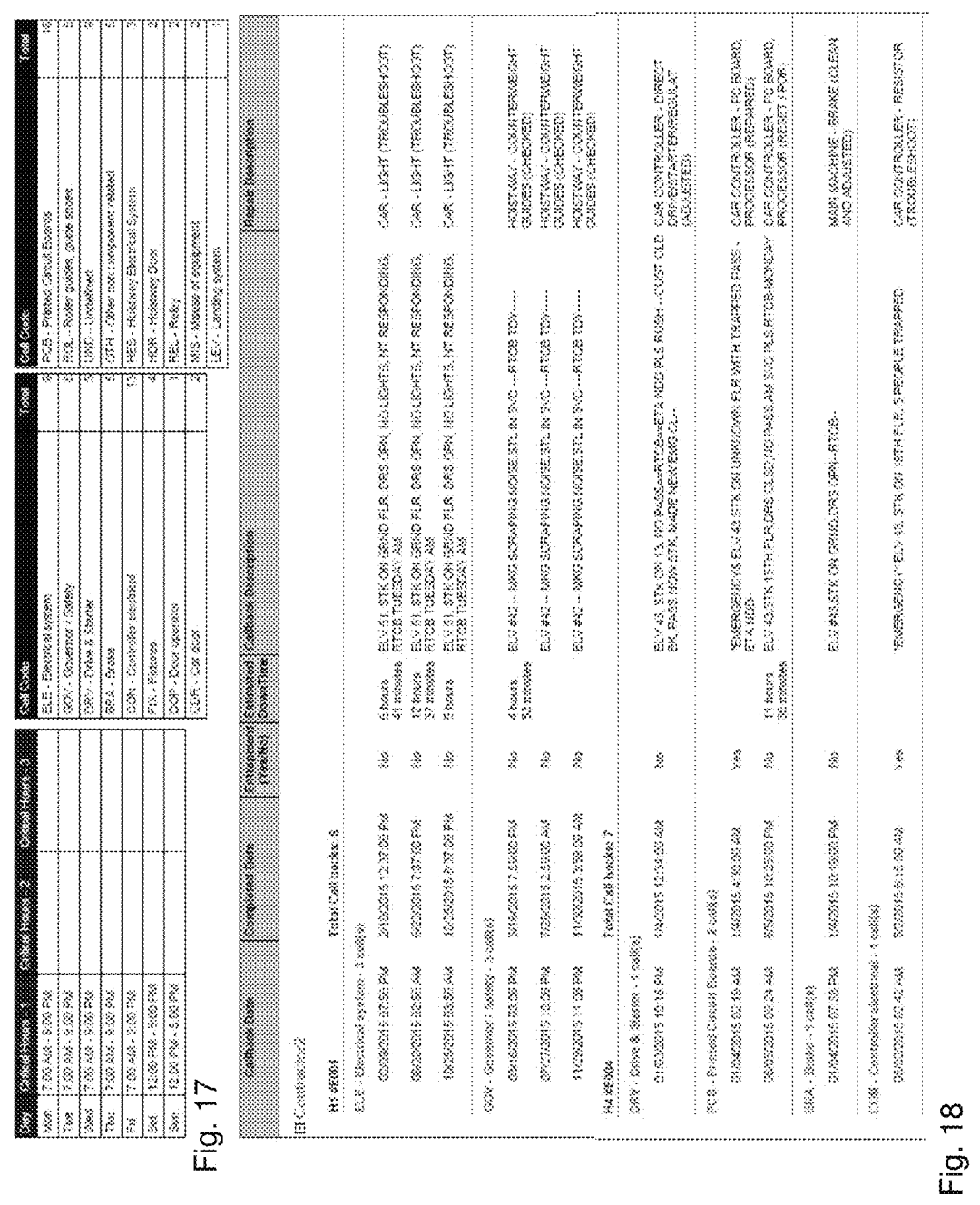

| Day | Critical Hours - 1 | Critical Hours - 2 | Critical Hours - 3 |
|---|---|---|---|
| Mon | 7:00 AM - 9:00 PM | | |
| Tue | 7:00 AM - 9:00 PM | | |
| Wed | 7:00 AM - 9:00 PM | | |
| Thu | 7:00 AM - 9:00 PM | | |
| Fri | 7:00 AM - 9:00 PM | | |
| Sat | 12:00 PM - 5:00 PM | | |
| Sun | 12:00 PM - 5:00 PM | | |

| Call Code | Total |
|---|---|
| ELE - Electrical system | 8 |
| GOV - Governor / Safety | 8 |
| DRV - Drive & Starter | 3 |
| BRA - Brake | 5 |
| CON - Controller electrical | 13 |
| FIX - Fixtures | 4 |
| DOP - Door operator | 1 |
| CDR - Car door | 2 |

| Call Code | Total |
|---|---|
| PCB - Printed Circuit Boards | 16 |
| ROL - Roller guides, guide shoes | 5 |
| UND - Undefined | 8 |
| OTH - Other non component related | 5 |
| HES - Hoistway Electrical System | 3 |
| HDR - Hoistway Door | 2 |
| REL - Relay | 2 |
| MIS - Misuse of equipment | 3 |
| LEV - Landing system | 1 |

Fig. 17

| Callback Date | Completed Date | Entrapment (Yes/No) | Estimated DownTime | Callback Description | Repair Description |
|---|---|---|---|---|---|
| ⊟ Contractor2 | | | | | |
| H1 #E001 | Total Call backs: 6 | | | | |
| ELE - Electrical system - 3 call(s) | | | | | |
| 02/09/2015 07:56 PM | 2/10/2015 12:37:00 PM | No | 6 hours 41 minutes | ELV 51, STK ON GRND FLR, DRS OPN, NO LIGHTS, NT RESPONDING, RTCB TUESDAY AM | CAR - LIGHT (TROUBLESHOOT) |
| 06/22/2015 02:56 AM | 6/22/2015 7:37:00 PM | No | 12 hours 37 minutes | ELV 51, STK ON GRND FLR, DRS OPN, NO LIGHTS, NT RESPONDING, RTCB TUESDAY AM | CAR - LIGHT (TROUBLESHOOT) |
| 10/26/2015 03:56 AM | 10/26/2015 8:37:00 PM | No | 5 hours | ELV 51, STK ON GRND FLR, DRS OPN, NO LIGHTS, NT RESPONDING, RTCB TUESDAY AM | CAR - LIGHT (TROUBLESHOOT) |
| GOV - Governor / Safety - 3 call(s) | | | | | |
| 03/18/2015 03:06 PM | 3/18/2015 7:59:00 PM | No | 4 hours 53 minutes | ELV #42 -- MKG SCRAPING NOISE,STL IN SVC ---RTCB TDY----- | HOISTWAY - COUNTERWEIGHT GUIDES (CHECKED) |
| 07/27/2015 10:06 PM | 7/28/2015 2:59:00 AM | No | | ELV #42 -- MKG SCRAPING NOISE,STL IN SVC ---RTCB TDY----- | HOISTWAY - COUNTERWEIGHT GUIDES (CHECKED) |
| 11/29/2015 11:06 PM | 11/30/2015 3:59:00 AM | No | | ELV #42 -- MKG SCRAPING NOISE,STL IN SVC ---RTCB TDY----- | HOISTWAY - COUNTERWEIGHT GUIDES (CHECKED) |
| H4 #E004 | Total Call backs: 7 | | | | |
| DRV - Drive & Starter - 1 call(s) | | | | | |
| 01/03/2015 10:16 PM | 1/4/2015 12:34:00 AM | No | | ELV 43, STK ON 13, NO PASS==RTCB==ETA NDD PLS RUSH --CUST CLD BK, PASS NOW STK, MADE NEW EMG CL-- | CAR CONTROLLER - DIRECT DRIVE/STARTER/REGULAT (ADJUSTED) |
| PCB - Printed Circuit Boards - 2 call(s) | | | | | |
| 01/04/2015 02:19 AM | 1/4/2015 4:30:00 AM | Yes | | *EMERGENCY* ELV 43 STK ON UNKNOWN FLR WITH TRAPPED PASS - ETA NDD- | CAR CONTROLLER - PC BOARD, PROCESSOR (REPAIRED) |
| 08/05/2015 09:24 AM | 8/5/2015 10:25:00 PM | No | 11 hours 30 minutes | ELV 43,STK 15TH FLR,DRS CLSD,NO PASS,AM SVC PLS,RTCB-MONDAY | CAR CONTROLLER - PC BOARD, PROCESSOR (RESET / POR) |
| BRA - Brake - 1 call(s) | | | | | |
| 01/04/2015 07:38 PM | 1/4/2015 10:19:00 PM | No | | ELV #43,STK ON GRND,DRS OPN--RTCB-- | MAIN MACHINE - BRAKE (CLEAN AND ADJUSTED) |
| CON - Controller electrical - 1 call(s) | | | | | |
| 09/02/2015 02:42 AM | 9/2/2015 6:15:00 AM | Yes | | *EMERGENCY* ELV 43, STK ON 18TH FLR, 5 PEOPLE TRAPPED | CAR CONTROLLER - RESISTOR (TROUBLESHOOT) |

Fig. 18

```
<?xml version="1.0" encoding="UTF-16"?>
<CallBacksObject xmlns:xsd="http://www.w3.org/2001/XMLSchema"
xmlns:xsi="http://www.w3.org/2001/XMLSchema-instance">
  - <CallBacks xmlns="urn:evolve:services">
    - <CallBack>
        <ContractID>61</ContractID>
        <GovernmentInstallationNumber>85759</GovernmentInstallationNumber>
        <DateTheProblemOccurred>2014-08-12T00:36:00</DateTheProblemOccurred>
        <CallCode>B99</CallCode>
        <CallBackDescription>(B99-ZC1) SOUTH ESC 2 OOS MAKING LOUD NOISE
          C/B/C JOEL INFORM FT ALREADY ON SITE</CallBackDescription>
        <CallBackTime>2014-08-12T00:36:00</CallBackTime>
        <CallBackReporterName>JOEL - SEC @ 4169612311</CallBackReporterName>
        <CallBackStatus>Completed</CallBackStatus>
        <CallBackClosedDate>2014-08-12T14:41:00</CallBackClosedDate>
        <Entrapment>false</Entrapment>
        <DispatchTime>2014-08-12T00:41:00</DispatchTime>
        <MechanicArrivedTime>2014-08-12T14:43:00</MechanicArrivedTime>
        <RepairDescription>BUZZER ON SIDE OF UNIT MAKING NOISE HAD TO TAPE
          IT UP.</RepairDescription>
        <CompletedDate>2014-08-12T14:41:00</CompletedDate>
        <WorkOrderNumber/>
        <InvoiceNumber/>
        <EstimatedCost>0</EstimatedCost>
        <ActualCost>0</ActualCost>
        <DirectiveCode/>
        <DeficiencyNumber/>
        <GovernmentMandatedCode/>
        <Counter>0</Counter>
        <IsBillable>false</IsBillable>
        <Labours>
          - <Labour>
              <MechanicName>SCOTT GLENN</MechanicName>
              <TicketNumber/>
              <MechanicRank/>
              <RegularWorkingHour>0</RegularWorkingHour>
              <TimeAndHalfWorkingHour>0</TimeAndHalfWorkingHour>
              <OvertimeWorkingHour>0</OvertimeWorkingHour>
              <TravelTime>0</TravelTime>
            - <Parts>
              - <Part>
                  <SKU/>
                  <OEM/>
                  <NonOEM/>
                  <PartName>Labour</PartName>
                  <Manufacturer/>
                  <Quantity>1</Quantity>
                  <Description/>
                  <Price>0</Price>
```

Fig. 19a

```
                </Part>
            -   <Part>
                    <SKU/>
                    <OEM/>
                    <NonOEM/>
                    <PartName>Tape</PartName>
                    <Manufacturer/>
                    <Quantity>1</Quantity>
                    <Description/>
                    <Price>50</Price>
                </Part>
            </Parts>
        </Labour>
    </Labours>
</CallBack>
<CallBack>
    <ContractID>61</ContractID>
    <GovernmentInstallationNumber>85761</GovernmentInstallationNumber>
    <DateTheProblemOccurred>2014-08-29T00:59:00</DateTheProblemOccurred>
    <CallCode>B93</CallCode>
    <CallBackDescription>(B93-ZC1) FRI AM-ESC S4-OOS-SHOWING ERR ON
        SCREEN FT GLENN VERF HE RTS THIS AM / INCORRECTLY UPDTED
        ETA</CallBackDescription>
    <CallBackTime>2014-08-29T00:59:00</CallBackTime>
    <CallBackReporterName>SHAMEKA - SEC @ 41696 | 2311</CallBackReporterName>
    <CallBackStatus>Completed</CallBackStatus>
    <CallBackClosedDate>2014-08-29T00:18:00</CallBackClosedDate>
    <Entrapment>false</Entrapment>
    <DispatchTime>2014-08-29T06:27:00</DispatchTime>
    <MechanicArrivedTime>2014-08-29T13:37:00</MechanicArrivedTime>
    <RepairDescription>HANDRAIL SENSOR TRIPPED RESET AND PUT UNIT BACK
        IN SERVICE.</RepairDescription>
    <CompletedDate>2014-08-29T00:18:00</CompletedDate>
    <WorkOrderNumber/>
    <InvoiceNumber/>
    <EstimatedCost>0</EstimatedCost>
    <ActualCost>0</ActualCost>
    <DirectiveCode/>
    <DeficiencyNumber/>
    <GovernmentMandatedCode/>
    <Counter>0</Counter>
    <IsBillable>false</IsBillable>
-   <Labours>
    -   <Labour>
            <MechanicName>SCOTT GLENN</MechanicName>
            <TicketNumber/>
            <MechanicRank/>
            <RegularWorkingHour>0</RegularWorkingHour>
            <TimeAndHalfWorkingHour>0</TimeAndHalfWorkingHour>
```

Fig. 19b

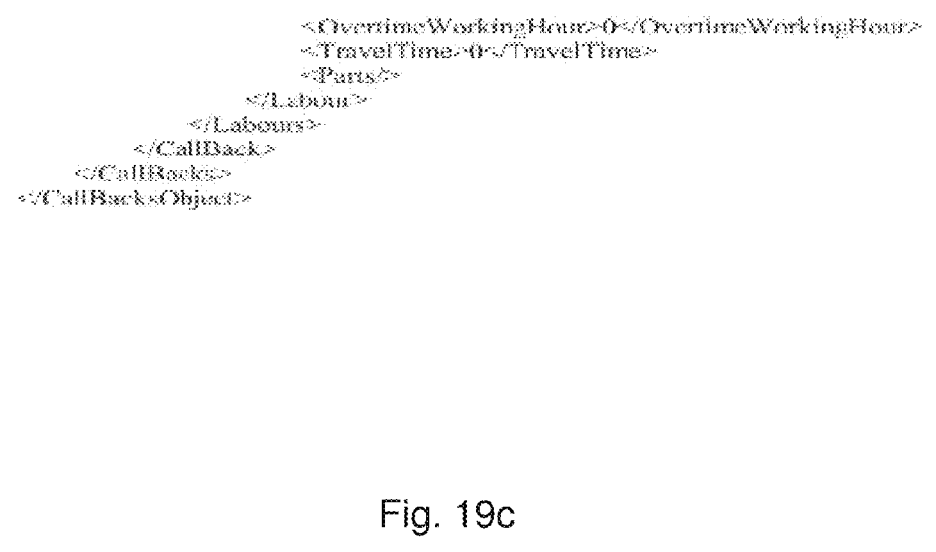

<OvertimeWorkingHour>0</OvertimeWorkingHour>
<TravelTime>0</TravelTime>
<Parts/>
</Labour>
</Labours>
</CallBack>
</CallBacks>
</CallBacksObject>

Fig. 19c

```
<?xml version="1.0" encoding="UTF-8"?>
<ArrayOfTask xmlns:xsi="http://www.w3.org/2001/XMLSchema-instance"
xmlns:xsd="http://www.w3.org/2001/XMLSchema">
- <Task>
      <TaskID>650275</TaskID>
      <PreviousTaskID/>
      <TaskType>Maintenance</TaskType>
      <Billable>false</Billable>
      <InvoiceNumber/>
      <InvoiceAmount>0</InvoiceAmount>
      <BuildingID>522791</BuildingID>
      <ProvinceCode>ON</ProvinceCode>
      <BuildingName>QUEENSTON MEDICAL DENTAL CNTRE (381HE008-D00114)
         </BuildingName>
      <CallerName/>
      <CallerPhone/>
      <CreationDate>7/3/2014 7:00:00 AM</CreationDate>
      <DispatchedDate/>
      <ArrivalTime/>
      <ClearedDate>8/19/2014 5:41:43 PM</ClearedDate>
      <CustomerIssue>(Customer Not Available)</CustomerIssue>
      <MechanicName>Akrveidinov, Timur</MechanicName>
      <MechanicComments>maintenance.</MechanicComments>
      <Status>Approved</Status>
      <StatusNotes/>
   - <Problems>
      - <Problem>
            <TaskID>650275</TaskID>
            <ProblemLineNumber>1</ProblemLineNumber>
            <AHJNumber>67227</AHJNumber>
            <Entrapment>false</Entrapment>
            <DownTime>0</DownTime>
            <ProblemID>HYD-MANDATORY</ProblemID>
            <ProblemComments>VISIT 3 OF 4</ProblemComments>
            <ResolutionCode>CM</ResolutionCode>
            <ResolutionDescription>Completed Maintenance</ResolutionDescription>
         - <CheckListItems>
            - <CheckListItem>
                  <TaskID>650275</TaskID>
                  <ProblemLineNumber>1</ProblemLineNumber>
                  <CheckListID>1</CheckListID>
                  <CheckListDescription>HWY</CheckListDescription>
              </CheckListItem>
            - <CheckListItem>
                  <TaskID>650275</TaskID>
                  <ProblemLineNumber>1</ProblemLineNumber>
                  <CheckListID>2</CheckListID>
                  <CheckListDescription>MR</CheckListDescription>
              </CheckListItem>
```

Fig. 20a

- <CheckListItem>
<TaskID>650275</TaskID>
<ProblemLineNumber>1</ProblemLineNumber>
<CheckListID>3</CheckListID>
<CheckListDescription>DAG</CheckListDescription>
</CheckListItem>
- <CheckListItem>
<TaskID>650275</TaskID>
<ProblemLineNumber>1</ProblemLineNumber>
<CheckListID>4</CheckListID>
<CheckListDescription>TOC</CheckListDescription>
</CheckListItem>
- <CheckListItem>
<TaskID>650275</TaskID>
<ProblemLineNumber>1</ProblemLineNumber>
<CheckListID>5</CheckListID>
<CheckListDescription>PIT</CheckListDescription>
</CheckListItem>
</CheckListItems>
</Problem>
</Problems>
- <Debriefs>
- <Debrief>
<TaskID>650275</TaskID>
<DebriefType>LBR</DebriefType>
<DebriefCode>B</DebriefCode>
<Quantity>2</Quantity>
<RegularWorkingHour>0</RegularWorkingHour>
<TimeAndHalfWorkingHour>0</TimeAndHalfWorkingHour>
<OvertimeWorkingHour>0</OvertimeWorkingHour>
<TravelTime>0</TravelTime>
</Debrief>
</Debriefs>
</Task>
- <Task>
<TaskID>802327</TaskID>
<PreviousTaskID/>
<TaskType>Callback</TaskType>
<Billable>true</Billable>
<InvoiceNumber/>
<InvoiceAmount>0</InvoiceAmount>
<BuildingID>507824</BuildingID>
<ProvinceCode>ON</ProvinceCode>
<BuildingName>MRS. CAMERON MONTROSE APTS. (24WIN003 00114)
</BuildingName>
<CallerName>darion</CallerName>
<CallerPhone>519-971-7033</CallerPhone>
<CreationDate>8/13/2014 4:53:01 PM</CreationDate>
<DispatchedDate>8/13/2014 4:54:43 PM</DispatchedDate>

Fig. 20b

```
<?xml version="1.0"?>
<DATA_ELEMENT>
 - <SERVICE_DATA>
      <NSA_CD>134</NSA_CD>
      <BUILDING_NAME>MANULIFE CTR</BUILDING_NAME>
      <STREET_ADDRESS>44 CHARLES ST W</STREET_ADDRESS>
      <CITY>TORONTO</CITY>
      <PROV>ON</PROV>
      <GOVT_NUMBER>021710</GOVT_NUMBER>
      <CNTRCT_OFFICE>FT</CNTRCT_OFFICE>
      <CNTRCT_NUMBER>05253</CNTRCT_NUMBER>
      <MACHINE_NUMBER>971343</MACHINE_NUMBER>
      <CALL_TYPE>S</CALL_TYPE>
      <CALL_DATE>2014-08-14</CALL_DATE>
      <CALL_TIME>19:07</CALL_TIME>
      <CALL_COMPLETED_DATE>2014-08-14</CALL_COMPLETED_DATE>
      <CALL_COMPLETED_TIME>23:36</CALL_COMPLETED_TIME>
      <RESPONSE_TIME>209</RESPONSE_TIME>
      <DEFER_IND>N</DEFER_IND>
      <CUSTOMER_REPORTED_1>H/R P7 CON ELV, STK B/T 1ST & 31ST FLR, HAD
         TRAPPED PASS-NOW OUT,</CUSTOMER_REPORTED_1>
      <CUSTOMER_REPORTED_2>CUST S/D ELV, OTCB AUTH NOW, ETA
         NDD</CUSTOMER_REPORTED_2>
      <PROB_CD>F01</PROB_CD>
      <PROBLEM_DESCRIPTION>HOISTWAY DOORS -
         INTERLOCK/ELECTRICAL</PROBLEM_DESCRIPTION>
      <PERF_DESC>ADJUSTED</PERF_DESC>
      <PERF_BY>OTIS</PERF_BY>
      <CAR_OCCUPIED>N</CAR_OCCUPIED>
      <REG_OT_IND>O</REG_OT_IND>
      <CALLER_NAME>SHAMIKA MALCOLM/SEC</CALLER_NAME>
      <MECHANIC_NAME>DOWNEY, BRIAN</MECHANIC_NAME>
      <PROCEDURE_DATE/>
      <PROCEDURE_CODE/>
      <PROCEDURE_DESCRIPTION/>
      <MINUTES_WORKED/>
      <PROV_GOVT_UNIT>021710</PROV_GOVT_UNIT>
   </SERVICE_DATA>
 - <SERVICE_DATA>
      <NSA_CD>134</NSA_CD>
      <BUILDING_NAME>NORTH AMERICAN CENTRE</BUILDING_NAME>
      <STREET_ADDRESS>5650 YONGE STREET</STREET_ADDRESS>
      <CITY>NORTH YORK</CITY>
      <PROV>ON</PROV>
      <GOVT_NUMBER>39019</GOVT_NUMBER>
      <CNTRCT_OFFICE>FTM</CNTRCT_OFFICE>
      <CNTRCT_NUMBER>05705</CNTRCT_NUMBER>
      <MACHINE_NUMBER>D98306</MACHINE_NUMBER>
      <CALL_TYPE>P</CALL_TYPE>
```

Fig. 21a

```
        <CALL_DATE/>
        <CALL_TIME/>
        <CALL_COMPLETED_DATE/>
        <CALL_COMPLETED_TIME/>
        <RESPONSE_TIME/>
        <DEFER_IND/>
        <CUSTOMER_REPORTED_1/>
        <CUSTOMER_REPORTED_2/>
        <PROB_CD/>
        <PROBLEM_DESCRIPTION/>
        <PERF_DESC/>
        <PERF_BY/>
        <CAR_OCCUPIED/>
        <REG_OT_IND/>
        <CALLER_NAME/>
        <MECHANIC_NAME>DAVIDSON, GRANT</MECHANIC_NAME>
        <PROCEDURE_DATE>09/03/2014</PROCEDURE_DATE>
        <PROCEDURE_CODE>990H</PROCEDURE_CODE>
        <PROCEDURE_DESCRIPTION>Sched UV Hydro</PROCEDURE_DESCRIPTION>
        <MINUTES_WORKED>15</MINUTES_WORKED>
        <PROV_GOVT_UNIT>39019</PROV_GOVT_UNIT>
    </SERVICE_DATA>
</DATA_ELEMENT>
```

Fig. 21b

SampleDataFromVendor3

```
<?xml version="1.0" encoding="utf-16"?>
<ArrayOfDT_Notif
xmlns:xsi="http://www.w3.org/2001/XMLSchema-instance"
xmlns:xsd="http://www.w3.org/2001/XMLSchema">
  <DT_Notif>
    <NotifDT>07/12/2014 07:06:55 AM</NotifDT>
    <NotifNum>44144199</NotifNum>
    <Prty>3</Prty>
    <EquipID>T5785621</EquipID>
    <EquipDesc>North ESC 1</EquipDesc>
    <Status>NOTIFICATION CLOSED OUT</Status>
    <IsBillable>N</IsBillable>
    <DsrdDT>07/12/2014 07:06:55 AM</DsrdDT>
    <DispDT>07/12/2014 07:17:34 AM</DispDT>
    <OperDisp />
    <Control />
    <TechID>00501949</TechID>
    <TechName>BRIAN HUNTER</TechName>
    <ArrvDT>07/12/2014 10:28:50 AM</ArrvDT>
    <BISDT>07/12/2014 11:34:41 AM</BISDT>
    <DepDT>07/12/2014 11:34:41 AM</DepDT>
    <CallerName>ALAN- SEC @ 4169612311</CallerName>
    <ProblemDesc>(B93-ZC1) ESC N1- INSRVC- MAKES GRINDING NOISE WHEN
STEPPING ON PLATFORM CLD CUST SHAMEKA W/ETA-GV ETA APRX
9:30</ProblemDesc>
    <Comment />
    <ReptDT>07/12/2014 07:06:55 AM</ReptDT>
    <LongText>ADJUST HANDRAIL TENSION TO REMOVE BUZZING</LongText>
    <WorkOrderNo />
    <CallCode>B93</CallCode>
  </DT_Notif>
  <DT_Notif>
    <NotifDT>07/12/2014 07:08:45 AM</NotifDT>
    <NotifNum>44144201</NotifNum>
    <Prty>3</Prty>
    <EquipID>T5783632</EquipID>
    <EquipDesc>North ESC 2</EquipDesc>
    <Status>NOTIFICATION CLOSED OUT</Status>
    <IsBillable>N</IsBillable>
    <DsrdDT>07/12/2014 07:08:45 AM</DsrdDT>
    <DispDT>07/12/2014 07:24:14 AM</DispDT>
    <OperDisp />
    <Control />
    <TechID>00501949</TechID>
    <TechName>BRIAN HUNTER</TechName>
    <ArrvDT>07/12/2014 09:58:12 AM</ArrvDT>
    <BISDT>07/12/2014 10:27:56 AM</BISDT>
    <DepDT>07/12/2014 10:27:56 AM</DepDT>
    <CallerName>ALAN- SEC @ 4169612311</CallerName>
    <ProblemDesc>(B92-ZC1) ESC N2- INSRVC- MAKES BUZZING NOISE EVERY
FEW MINUTES CLD CUST SHAMEEKA W/ETA-GV ETA APRX 9:30</ProblemDesc>
    <Comment />
```

Page 1

Fig. 22a

SampleDataFromVendor3

<ReptDT>07/12/2014 07:08:45 AM</ReptDT>
<LongText>LOWER LANDING PLATE GRINDING ON STEP TREADS. RAISED PLATE, TESTED, RTS</LongText>
<WorkOrderNo />
<CallCode>892</CallCode>
</DT_Notif>
<DT_Notif>
<NotifDT>07/13/2014 01:12:38 PM</NotifDT>
<NotifNum>44154068</NotifNum>
<Prty>3</Prty>
<EquipID>T5785632</EquipID>
<EquipDesc>North ESC 2</EquipDesc>
<Status>NOTIFICATION CLOSED OUT</Status>
<IsBillable>N</IsBillable>
<DsrdDT>07/13/2014 01:12:38 PM</DsrdDT>
<DispDT>07/13/2014 01:19:00 PM</DispDT>
<OperDisp />
<Control />
<TechID>00501949</TechID>
<TechName>BRIAN HUNTER</TechName>
<ArrvDT>07/13/2014 03:04:51 PM</ArrvDT>
<BISDT>07/13/2014 03:35:51 PM</BISDT>
<DepDT>07/13/2014 03:35:51 PM</DepDT>
<CallerName>JERRY-SECURITY @ 4169612311</CallerName>
<ProblemDesc>(893-ZC1) ESC NORTH 02 CUST S/D BURNING RUBBER SMELL COMING FROM RIGHT HANDRAIL GV JERRY 3:15 PM FT ETA</ProblemDesc>
<Comment />
<ReptDT>07/13/2014 01:12:38 PM</ReptDT>
<LongText>HANDRAIL ADJUSTMENT.</LongText>
<WorkOrderNo />
<CallCode>893</CallCode>
</DT_Notif>
<DT_Notif>
<NotifDT>07/14/2014 06:48:40 PM</NotifDT>
<NotifNum>44168238</NotifNum>
<Prty>3</Prty>
<EquipID>T5785621</EquipID>
<EquipDesc>North ESC 1</EquipDesc>
<Status>NOTIFICATION CLOSED OUT</Status>
<IsBillable>N</IsBillable>
<DsrdDT>07/14/2014 07:03:00 PM</DsrdDT>
<DispDT>07/14/2014 09:09:37 PM</DispDT>
<OperDisp />
<Control />
<TechID>00500351</TechID>
<TechName>PAUL O'NEILL</TechName>
<ArrvDT>07/14/2014 09:34:27 PM</ArrvDT>
<BISDT />
<DepDT>07/14/2014 10:00:29 PM</DepDT>
<CallerName>JERRY-SECURITY @ 4169612311</CallerName>
<ProblemDesc>(893-ZC1) ESC 1 CUST SD AFTER BURNNG SMELL CAME FROM HANDRAIL CLD FT ONEILL CELL/ HE WILL PICK UP ON LINK Page 2

Fig. 22b

SampleDataFromVendor3

```
ASAP</ProblemDesc>
      <Comment />
      <ReptDT>07/14/2014 06:48:40 PM</ReptDT>
      <LongText>RAN ESC FOR 25 MINUTES , RIGHT HANDRAIL WAS A LITTLE
WARM . SHUT IT DOWN AND LEFT FOR ESC CREW. .</LongText>
      <WorkOrderNo />
      <CallCode>B93</CallCode>
    </DT_Notif>
    <DT_Notif>
      <NotifDT>07/14/2014 06:49:06 PM</NotifDT>
      <NotifNum>44168239</NotifNum>
      <Prty>3</Prty>
      <EquipID>TS785632</EquipID>
      <EquipDesc>North ESC 2</EquipDesc>
      <Status>NOTIFICATION CLOSED OUT</Status>
      <IsBillable>Y</IsBillable>
      <DsrdDT>07/14/2014 07:04:00 PM</DsrdDT>
      <DispDT>07/14/2014 09:09:15 PM</DispDT>
      <OperDisp />
      <Control />
      <TechID>00500351</TechID>
      <TechName>PAUL O'NEILL</TechName>
      <ArrvDT>07/14/2014 10:01:47 PM</ArrvDT>
      <BISDT>07/14/2014 10:16:03 PM</BISDT>
      <DepDT>07/14/2014 10:16:03 PM</DepDT>
      <CallerName>CHRIS SEC @ 4169612311</CallerName>
      <ProblemDesc>(B05-ZC7) ESC 2 CUST S/D BURNING SMELL COMING FROM
HANDRAIL ADVISED P/C ETA EXPIERD MD OUT</ProblemDesc>
      <Comment />
      <ReptDT>07/14/2014 06:49:06 PM</ReptDT>
      <LongText>ROA</LongText>
      <WorkOrderNo>5350250604</WorkOrderNo>
      <CallCode>B05</CallCode>
    </DT_Notif>
    <DT_Notif>
      <NotifDT>07/21/2014 06:21:07 AM</NotifDT>
      <NotifNum>44233241</NotifNum>
      <Prty>3</Prty>
      <EquipID>TS231030</EquipID>
      <EquipDesc>South ESC 4</EquipDesc>
      <Status>NOTIFICATION CLOSED OUT</Status>
      <IsBillable>N</IsBillable>
      <DsrdDT>07/21/2014 06:21:07 AM</DsrdDT>
      <DispDT>07/21/2014 11:20:15 AM</DispDT>
      <OperDisp />
      <Control />
      <TechID>00500761</TechID>
      <TechName>SCOTT GLENN</TechName>
      <ArrvDT>07/21/2014 11:42:02 AM</ArrvDT>
      <BISDT>07/21/2014 11:24:20 AM</BISDT>
      <DepDT>07/21/2014 11:24:20 AM</DepDT>
      <CallerName>STEVE- SEC @ 4169612311</CallerName>
```

Page 3

Fig. 22c

SYSTEM FOR MONITORING ELEVATORS AND MAINTAINING ELEVATORS

CROSS-REFERENCE TO RELATED APPLICATIONS

This application is a continuation-in-part of U.S. patent application Ser. No. 14/514,260, filed on Oct. 14, 2014 and titled "Method of Retrieving and Uniformalizing Elevator Maintenance and Callback Data and Code Events".

TECHNICAL FIELD

The invention generally relates to monitoring lift devices and maintaining the maintenance of the lift devices and, in particular, elevators.

BACKGROUND

Often, facility owners have multiple service providers for escalators or elevators, or both, to maintain and repair their equipment, which is generally manufactured by various manufacturers. The service provider provides regular maintenance visits on a monthly, quarterly, or annual basis, as well as support in case of emergency (also called "callback").

Callback is typically initiated by facility owners by using a telephone to call the service provider. Once initiated, the service provider enters the information obtained from the telephone discussion into its internal computer system and dispatches a technician to travel to the location of the faulty lift device. The information generated from the call and the dispatch becomes a part of the callback history, which is stored in a database. In some cases, facility owners are able to monitor and access the callback history, via an Internet connection, from the service provider's website. See FIG. 1.

SUMMARY

Example aspects and embodiments of the proposed systems and methods are provided herein. However, the systems and methods are not limited to the features described in this summary section. Furthermore, there may be additional aspects of the systems and methods that are not stated in this summary section.

The systems and methods relate to data retrieval and uniformalization of code events data for an elevator, where any number of various service providers transmit code events from an elevator controller to a business partner through a web services application. The business partner retrieves and uniformalizes the data, and then presents the data through a web application. The data is uniformalized by mapping it into the database of the web server with data restrictions, and then converting the data to match those data restrictions. In one embodiment, the business partner can back up the data on a web server. In another embodiment, the data can be XML webservices data and can be retrieved, uniformalized and stored on a datastore.

In another example aspect, there is a method for data retrieval and uniformalization. In such an embodiment, a service provider stores elevator data and transmits that data to a web services application. A business partner then retrieves that data through the web services application, uniformalizes the data, and then stores the data in a business partner web server. In another embodiment, the data can be data concerning elevator maintenance and service calls. The data is uniformalized by determining a mapping for the data into the database of the web server with data restrictions, and then converting that data to match its restrictions. In a separate example embodiment, the data can be XML web-services data and the data can be retrieved, uniformalized and stored on a datastore. In another example embodiment, a manufacturer application and API can be installed, where the manufacturer application and API transmit data to the web services application, allowing remote access by the end user. In yet another embodiment, the business partner can back up the stored data on a web server. In another embodiment of the present invention, the business partner may present the uniformalized data through an intuitive web application. The data from more than one elevator can be shown simultaneously in the web application. In yet another example embodiment, the user can initiate and control callback by using a web services application, as well as communicate with the service provider through web services to make a call for service. In another example embodiment, the business partner can set up web services for mobile applications, which allows mobile communication for the service provider with the business partner's datastore. The end user can then initiate a call using the business partner mobile application, communicating with the service provider through web services that makes a call for service of an elevator. In another example embodiment, the end user can control callback by accessing the business partner's web server and initiating a call using a web services application. The web server can have a single sign on. In another example embodiment, a standard presentation may display information from one or more service providers. In another example embodiment, the web application can analyze datasets, display performance and deficiency information, and send out notifications to a single individual or multiple concerned parties.

In another example embodiment, a computing process for processing safety data related to one or more lift devices, includes: a server receiving an inspection order via an application programming interface (API) that includes an identifier of a given lift device and a compliance deadline, the inspection order transmittable by a safety monitoring server; in response, the server identifying a user account associated with the given lift device using a database on the server; and the server automatically compiling and sending a notification to the user account comprising the inspection order.

BRIEF DESCRIPTION OF DRAWINGS

Embodiments will now be described by way of example only with reference to the appended drawings wherein:

FIGS. 8*a*, 8*b* and 8*c* show examples of datasets;

FIGS. 9*a*, 9*b* and 9*c* show examples of other datasets;

FIG. 10*a* shows an example of an XML string being transmitted;

FIG. 10*b* shows an example of data conversion;

FIG. 10*c* shows the data types of the Building Events Table;

FIG. 17 is a screenshot of an example GUI showing critical hours and error codes;

FIG. 18 is a screenshot of an example GUI showing a report showing reformatted error codes associated with certain elevators or escalators, or both;

FIG. 19*a* shows an example of XML data from Vendors that is used to encapsulate the maintenance or callback history, or both, of an elevating device;

FIG. 19*b* shows an example of XML data from Vendors that is used to encapsulate the maintenance or callback history, or both, of an elevating device;

FIG. 19*c* shows an example of XML data from Vendors that is used to encapsulate the maintenance or callback history, or both, of an elevating device;

FIG. 20*a* shows an example of XML data from Vendors that is used to encapsulate the maintenance or callback history, or both, of an elevating device;

FIG. 20*b* shows an example of XML data from Vendors that is used to encapsulate the maintenance or callback history, or both, of an elevating device;

FIG. 21*a* shows an example of XML data from Vendors that is used to encapsulate the maintenance or callback history, or both, of an elevating device;

FIG. 21*b* shows an example of XML data from Vendors that is used to encapsulate the maintenance or callback history, or both, of an elevating device;

FIG. 22*a* shows an example of XML data from Vendors that is used to encapsulate the maintenance or callback history, or both, of an elevating device;

FIG. 22*b* shows an example of XML data from Vendors that is used to encapsulate the maintenance or callback history, or both, of an elevating device; and FIG. 22*c* shows an example of XML data from Vendors that is used to encapsulate the maintenance or callback history, or both, of an elevating device.

DETAILED DESCRIPTION

Figure 1:
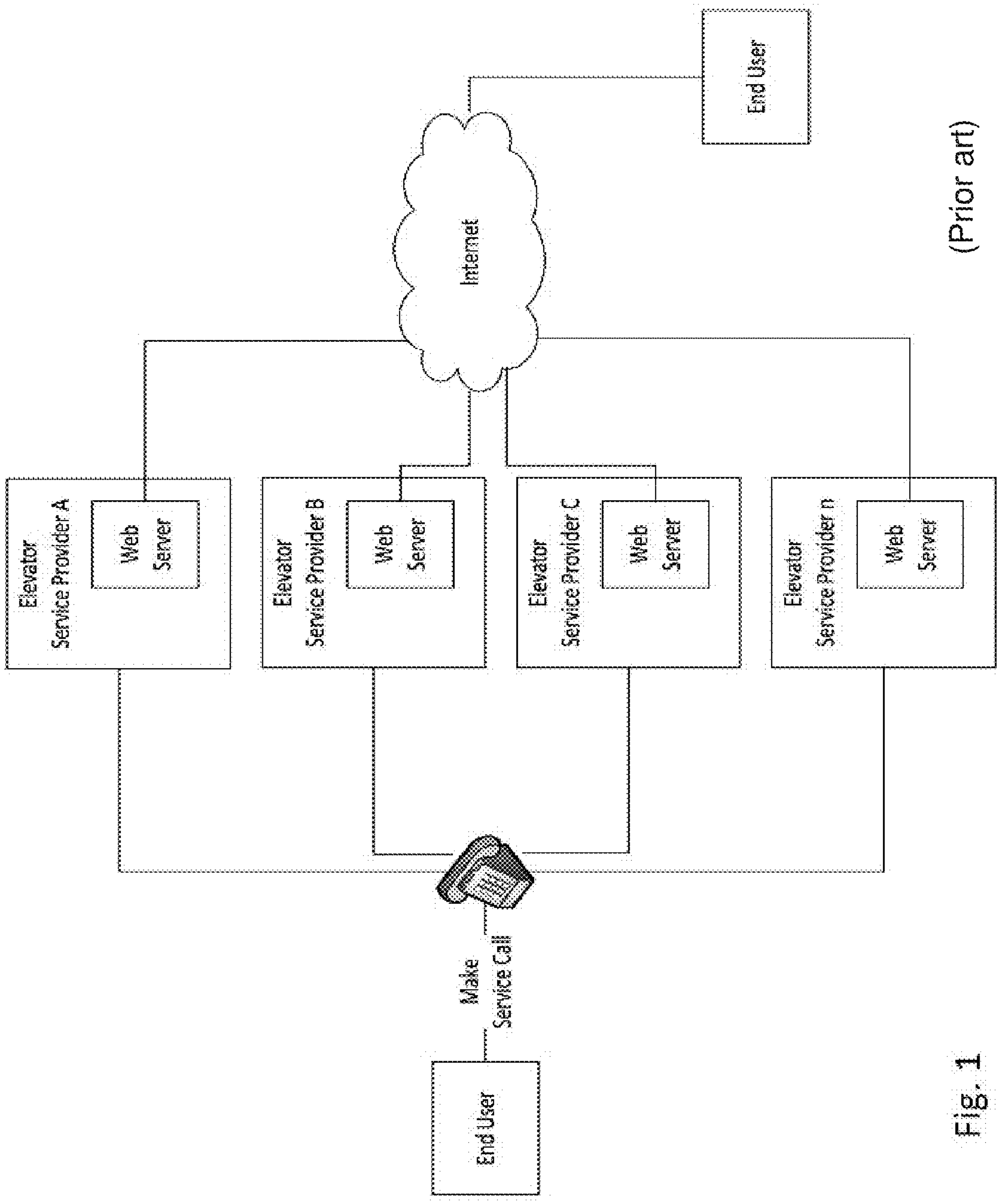
FIG. 1 shows a flowchart of the data retrieval process of the current art in which the end user requests callback by calling individual service providers, according to an embodiment of the present invention.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The term “elevator” is used herein in most examples. However, it will be appreciated that the principles and examples described herein with respect to elevators also apply to other lift devices, such as escalators.

Figure 2:
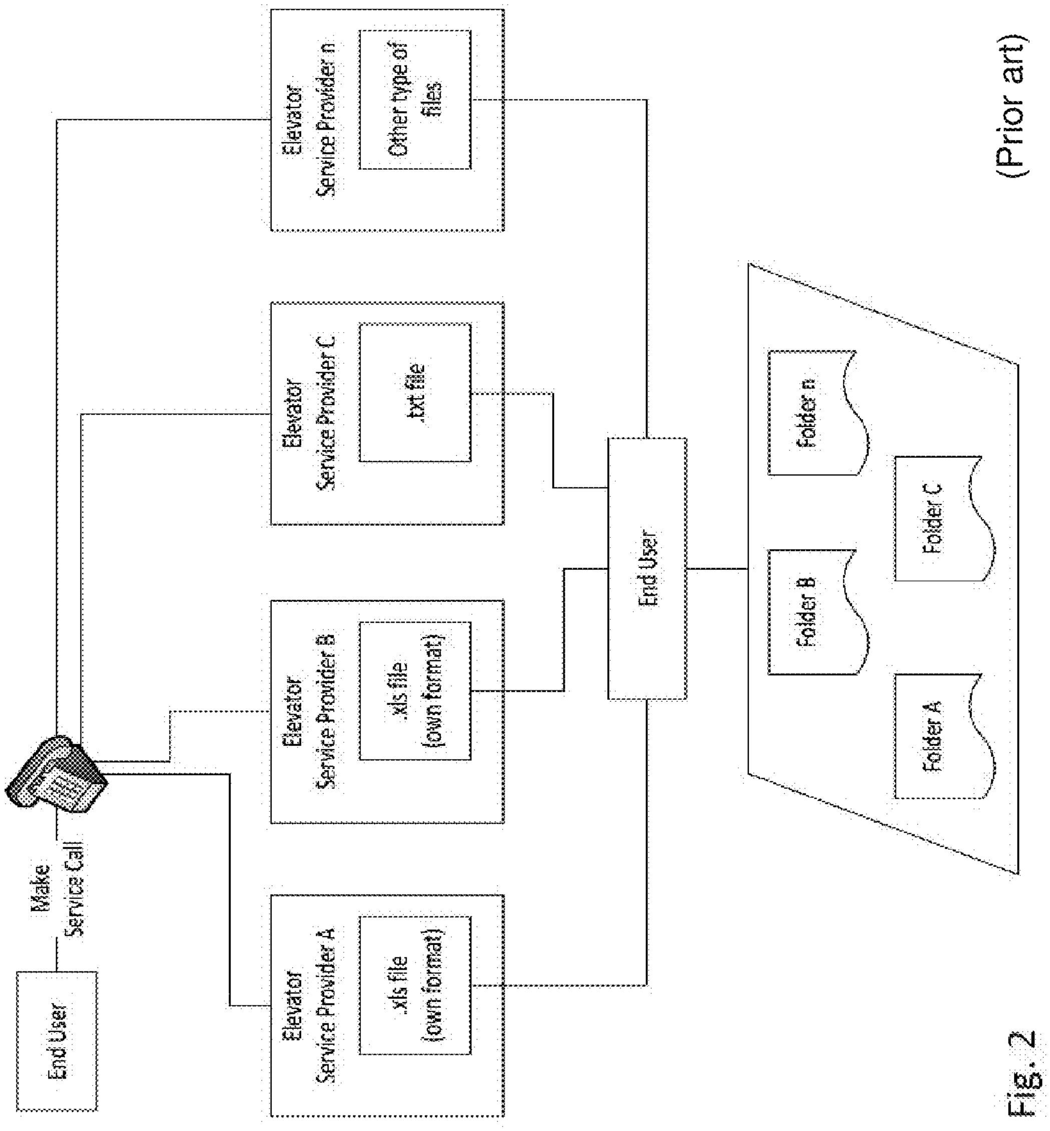
FIG. 2 shows a flowchart of the data retrieval process of the current art as in FIG. 1, further elaborating that the information from service providers are generally in various file types, according to an embodiment of the present invention.

Whether facility owners have a single building or multiple buildings, they generally have multiple service providers. With the use of multiple service providers, facility owners are forced to manage multiple accounts in order to access the different web applications from each service provider. Additionally, the various service providers utilize different codes, data formats and presentations with respect to their data files. See FIG. 2. These codes and data formats are part of the service provider’s or the manufacturer’s computer system. Therefore, for the facility owner, it is a mammoth task to collect and interpret the information from the various service providers, as there is no uniformalization of information storage among the various service providers. To further complicate this situation, service providers’ computer files are not always available, and are typically accessible only on an on-demand basis.

At the conclusion of a contract for services, facility owners may decide not to extend the contract with the service providers depending on multiple factors (e.g., quality of service, new service provider offers, etc.). When the contract between the facility owner and the service provider is terminated, the facility owner no longer has access to data and the computing systems of the service provider during the contract tenure. As a result, the callback and maintenance history is no longer available to the facility owner.

Since elevators and escalators have become computer controlled, they store elevator codes or events (e.g., information on the heat detectors or landing sensors) in the controller. It is herein recognized that, unfortunately, elevator/escalator code/event information is stored in a form that is proprietary to each manufacturer, and usage and maintenance data from different manufacturers cannot be compared.

Technicians who service elevators and escalators typically need to be at the physical location of the elevator controller to access the data from the controller. In particular, a technician is able to access various statistical data, events of use and the last service intervals from each elevator. From this data, technicians are able to facilitate servicing of the equipment.

In some cases the facility owner is able to access the controller’s event and code via a computer that is directly connected to the controller, either wired or wirelessly. The computer typically is at the same location as the controller. It is herein recognized that due to the direct connection between the controller and the facility owner’s computer, the facility owner must be at the computer in order to open and view the event and code from the controller. As a result of the direct data connection between the controller and the computer, the facility owner has to manage multiple accounts and different computers located at different physical locations. Additionally, the facility owner has no backup in case of data failure/disaster recovery. Further, the facility owner may not have experience understanding the data from the controller. Furthermore, it is very unlikely that the facility owner would have the experience or knowledge to interpret the controller data to anticipate problems.

It is herein recognized that comparison of maintenance and usage data from various manufacturers is beneficial as it enables streamlining of maintenance procedures and comparison of elevators under different usage circumstances. It is also herein recognized that a method of uniformalizing has not been heretofore been used, which leads to the above noted technical difficulties. Therefore, there is a need to retrieve and uniformalize elevator usage and maintenance data.

It is also herein recognized that current computing systems do not provide timely information to facility owners. Or, if information is constantly provided or accessible to a facility owner, the urgency of the information is not indicated. Typically, computing systems for elevators do not automatically process currently received elevator controller data and historical data stored in a database to identify the technical issues of an elevator, and nor do typical computing systems executed computations to determine and output recommendations for addressing these technical issues.

The proposed computing systems and methods address one or more of the above technical difficulties. In particular, a system includes an elevator monitoring, maintenance and management (EMMM) server that is in data communication with other computing machines or devices, including one or more of: a computing device that is in direct communication with an elevator controller, a server of an elevator service provider, a server of a safety monitoring party, and a computing device of a facility owner. The system collects elevator data and processes the same to, for example, index events, monitor the status of elevators, identify technical problems, and provide notifications and reports. For example, a safety monitoring party is a technical and safety standards authority that enforces safety.

Figure 3:
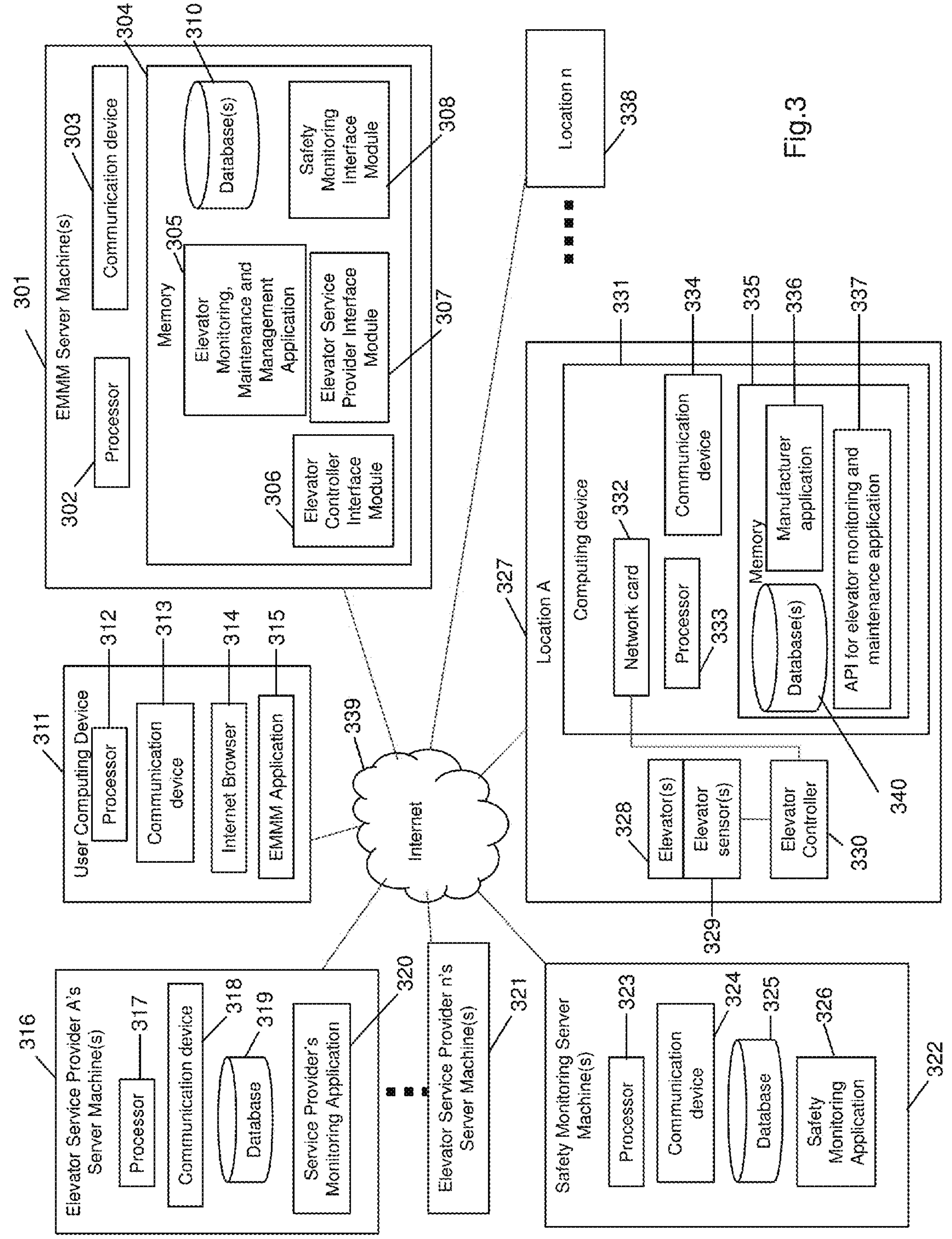
FIG. 3 is an example system diagram of an elevator monitoring, maintenance, and management (EMMM) server in data communication with other computing devices or server machines, or both.

Turning to FIG. 3, an example computing system is provided. One or more EMMM server machines 301, a user computing device 311, one or more server machines of various elevator service providers 316, 321, one or more safety monitoring server machines 322 of a safety monitoring party, and computing devices at different elevator locations 327, 338 are in data communication with each other over an Internet network 339. Other communication networks may be used, which may or may not include the Internet. For example, some communication networks include telecommunication networks, LAN networks, or wireless networks, or combinations thereof.

While each entity may utilize multiple server machines as part of their own server system, for brevity, the term "server" will hereon be used. Therefore, it is appreciated that the term "server" includes one or more server machines.

The EMMM server 301 obtains data from the computing devices 331 connected to the elevator controllers, obtains data from the elevator service provider servers 316, and obtains data from the safety monitoring servers 322. The EMMM server also provides data to the elevator service provider servers 316, the user computing devices 311, and the safety monitoring servers 322.

The EMMM server 301 includes a processor 302, a communication device 303 for receiving and transmitting data over the network 339, and memory 304. The memory includes one or more databases 310, an EMMM application 305, an elevator controller interface module 306 that interacts with a computing device 331 connected to an elevator controller 330, an elevator service provider interface module 307 that interacts with an elevator service provider server 316, and a safety monitoring interface module 308 that interacts with a safety monitoring server 322. In an example embodiment, these interface modules interact with corresponding application programming interfaces (APIs). In another example embodiment, these interface modules include APIs or are APIs. The databases 310 may also be herein referred to as a datastore.

At a given location (e.g. Location A 327), there are one or more elevators 328. Each elevator system is equipped with one or more sensors 329. Examples of these sensors include: encoders, current sensors, hall-effect sensors, floor level sensors, door sensors, limit switches, temperature probes, and pressure sensors. It will be appreciated that other currently known and future-known sensors used in elevators or other lift devices are applicable. The sensors provide data to an elevator controller 330. The elevator controller transmits data to a computing device 331 located in the same general location (e.g. in a control room in the building). For example, the data from the elevator controller is received by the computing device 331 via a network card 332 on the computing device 331. In an example embodiment, the controller and the network card communicate over a wireless interface (e.g. Bluetooth, Wifi, etc.). In another example embodiment, the controller and the network card communicate with each other using a wire. Example embodiments of communication protocols include TCP, HTTP and SOAP. Within a given location, e.g. Location A, there may be multiple elevators and multiple elevator controllers that are in communication with one or more computing devices 331. Consider a building that has both elevators and escalators. However, a single elevator controller and a single computing device are shown in the example for Location A 327.

The computing device 331 also includes a processor 333, a communication device 334 for communicating over the network 339, and memory 335. The memory 335 includes a manufacturer application 336 for interpreting and logging the data, and an API for the EMMM application 337. Other locations (e.g. Location n 338) have similar systems. In particular, the manufacturer provides the application 336 which retrieves the information from their elevator controller. This application has a local database 340 where the information is being stored, such as in memory 335. This application is accessible to the client on site (e.g. Location A or some other location). The manufacturer provides an interface (e.g. API) to access the local database 340. In an example embodiment, the API 337 does not access the elevator controller. In an example embodiment, the API allows other software applications to communicate with the manufacturer application 336, which in turn, triggers the manufacturer application to communicate with the elevator controller. The EMMM application 305 uses the elevator controller interface module 306 to communicate with the computing device 331 over the Internet 339, and in particular to communicate with the API 337. The EMMM application 305 accesses the information on the local database 340 stored on the computing device 331, and the information from the local database 340 is transmitted to the EMMM server 301. It will be appreciated that the EMMM application 305 is able to obtain various types of electronic information from an elevator controller, and is able to process such electronic information for monitoring, maintenance and management.

In an example embodiment, the EMMM application 305 is able to obtain MCP (Maintenance Control Program) tests or maintenance tasks, or both, about the elevator controller via the API. In particular, this information is stored on the local database 340 and sent to the EMMM server 301. In other words, the data obtained by the EMMM server includes various types of data, including for example: fault logs, error warnings, and maintenance tasks.

The safety monitoring server 322 includes data systems for facilitating processes of safety regulation. For example, a safety regulating body issues inspection reports and inspection orders. An inspection order is a task that must be executed to maintain safety of the device. The server 322 includes a processor 323, a communication device 324, a database 325 to index and manage the safety and maintenance information of the elevators, and a safety monitoring application 326 that tracks the inspections and the inspection orders. The safety monitoring server 322 and the EMMM server 301 exchange data with each other to manage the inspections and the inspection orders.

The elevator service provider's server 316 includes a processor 317, a communication device 318, a database 319 and a service provider's monitoring application 320. The data stored and provided by the server 316 may be in a specific data format that is characteristic of the elevator service provider. In other words, another service provider n has stored on its server 321 elevator data that is in a different data format compared to the server 316. It will be appreciated that there may be multiple service providers, and their respective servers are in data communication with the EMMM server 301.

A facility owner is considered a user and uses a computing device 311 to monitor and interact with the management of the elevators and other lift devices for which they are responsible. As noted above, the EMMM server 301 is able to accommodate multiple facility owners, each facility owner responsible for different types of lift devices that may be at different locations. The facility owner, also called a user, uses a computing device that includes a processor 312, a communication device 313, and an Internet Browser 314. The graphical user interfaces (GUIs) provided by the EMMM server, for example, are web pages accessible via an Internet Browser. In another example, the computing device 311 includes an EMMM application 315. This may be desirable, for example, where the computing device is a mobile device (e.g. tablet, smart phone, cellphone, etc.), but the application may also be used with non-mobile devices. The computing device includes both mobile and non-mobile devices.

Figure 4:
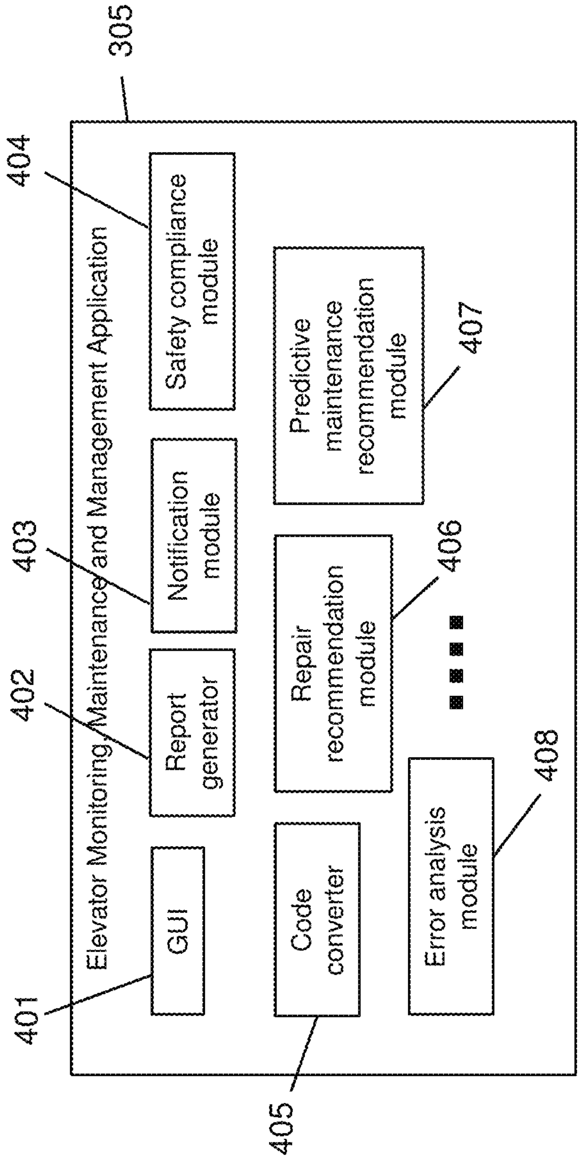
FIG. 4 is a block diagram showing example components of an EMMM application on the EMMM server.

At FIG. 4, example components of the EMMM application 305 are shown, including: a graphical user interface (GUI) 401, a report generator 402, a notification module 403, a safety compliance module 404, a code converter 405, a repair recommendation module 406, a predictive maintenance recommendation module 407, and an error analysis module 408. The GUI 401 generates GUIs, example aspects of which are shown in the figures. The report generator compiles data and automatically generates reports, which may be viewed via the GUI and also sent to other computing devices or servers, or both. The notification module generates and sends notifications to other computing devices or servers, or both. The safety compliance module tracks inspections and inspection orders, and automatically generates and sends reminders if inspection orders are not complete by a certain date. The code converter is manages and maps the databases of error codes that are specific to each of the service providers, and is able to convert these specific error codes in the service provider format to an EMMM format. The EMMM format is used throughout the system to provide uniformity and consistency to the users. The repair recommendation module includes computing processes to analyze the elevator data and recommend repairs to an elevator. The predictive maintenance module includes computing processes to analyze the elevator data and output maintenance actions and timelines in anticipation of elevator wear and elevator technical failure. The error analysis module includes computing processes to analyse the elevator data and output root problems of an elevator. The root problems may be technical. In another example, the root problems may also include human error (e.g. incorrect repairs, late maintenance, untimely response to elevator emergency, etc.).

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or computing devices or accessible or connectable thereto. Any application or module herein described may be implemented using computer readable/executable instructions that may be stored or otherwise held by such computer readable media.

Figure 5:
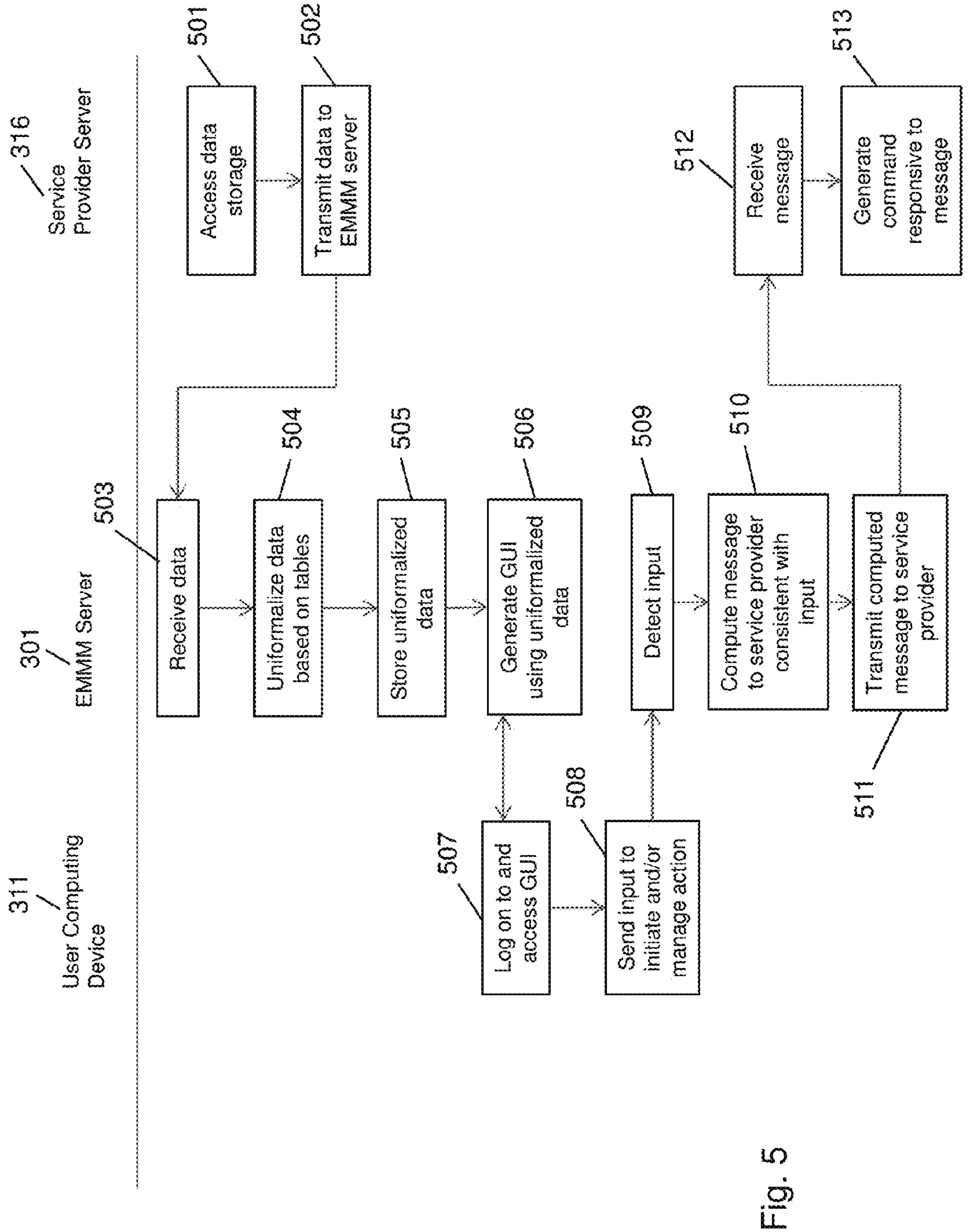
FIG. 5 is a flow diagram of example computer executable instructions for a data retrieval process of data from a service provider server.

With reference to FIG. 5, example computer executable instructions are provided for data retrieval and uniformalization of elevator/escalator (referred to generally as "elevator") maintenance and callback data. FIG. 5 relates to service providers that provide maintenance and standby on call service. The service providers perform standard maintenance, and store the maintenance information on the service provider's data storage. Furthermore, the service provider may be called ("service call") by the user to rectify an issue with an elevating device, in which case the service provider will repair the elevator, and again store the service call information on the service provider's data storage. There is therefore information on both i) maintenance and ii) service calls on the service provider's data storage. The service provider has a web application that allows a user to log in and track the information and status of the maintenance and service call completed by the service provider. At block 501 a given service provider server accesses their data storage, and transmits that data to the EMMM server (block 502), for example, via a web services application. The EMMM server receives the data (block 503), and then uniformalizes the data based on table mappings (block 504). The processed data is therefore in an EMMM format, which stored on the EMMM server (block 505). For example, in the data retrieval and uniformalization process, the information using XML webservices is retrieved, uniformalized and stored on the database 310. At block 506, the EMMM server generates a GUI and populates the GUI with the uniformalized data for display. For example, an end user can view the GUI through a web application usable on a computing device 311. In particular, the user computing device logs on to the EMMM server website or application portal to access the GUI (block 507). Through the GUI, the user computing device sends inputs to initiate an action or manage an action, or both (block 508). The actions include, for example, initiating and controlling callback. The EMMM server detects the input (block 509), computes a message to a service provider that is consistent with the input (block 510) and transmits the computed message to the service provider server (block 511). At block 512, the service provider server receives the message, and then generates a command responsive to the message (block 513). The command, for example, is to send a message to a technician to go to the location of elevator to execute a repair or perform an inspection, or both.

Figure 6:
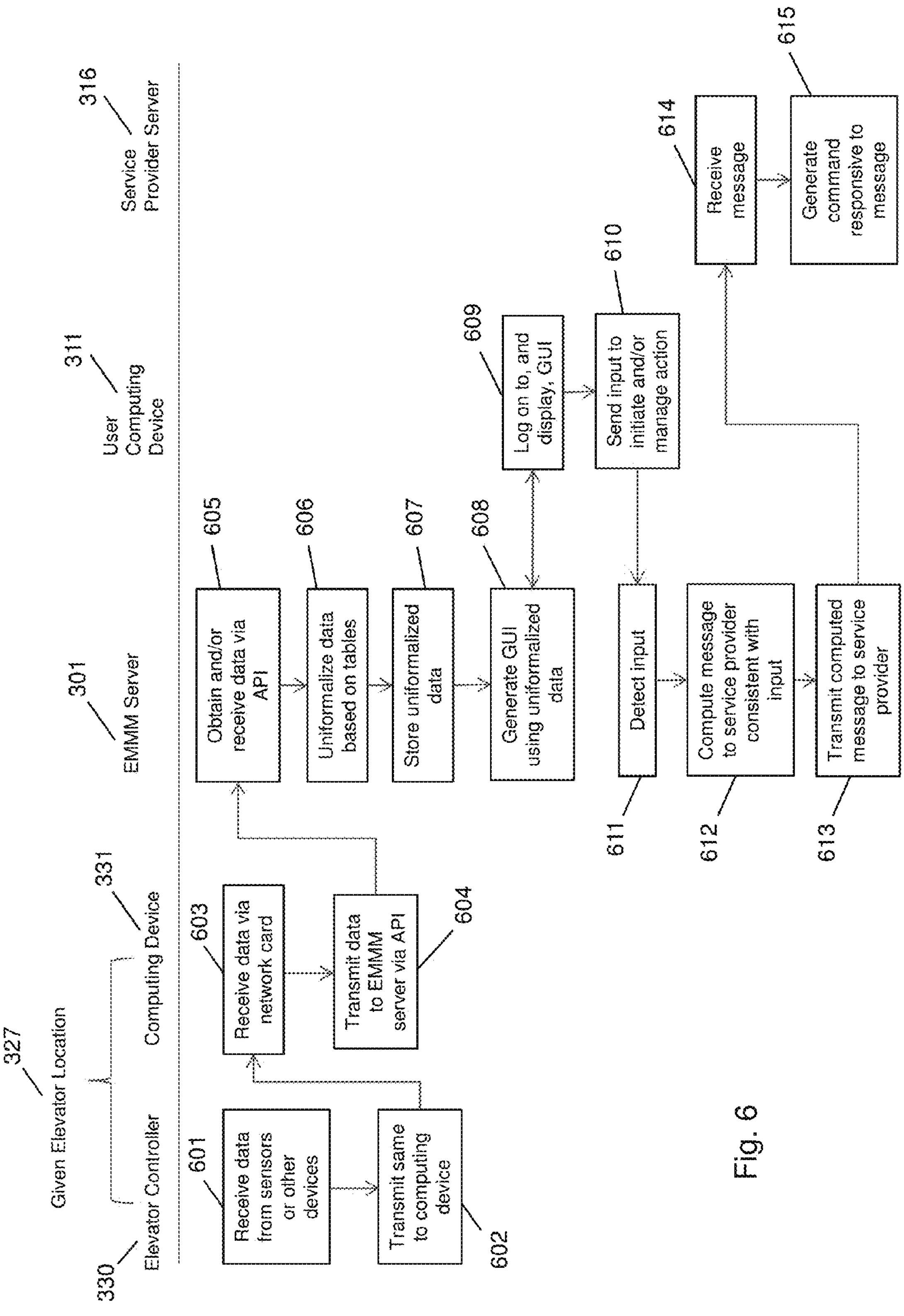
FIG. 6 is a flow diagram of example computer executable instructions for a data retrieval process of data from an elevator controller.

With reference to FIG. 6, another example embodiment of computer executable instructions is provided for retrieving and processing data obtained from an elevator controller. Elevator controllers, which are devices built by disparate manufacturers, are installed on the machine room and control the operation of the elevator. The controllers collect and store data regarding the performance and service of each of the elevating devices, such as storing code events. Examples of code events are Heat Detectors, Recall Activated, Landing System Sensor Fault and Emergency Power Activated. A user can see events or codes for an elevator from a computer which has a direct connection to the controller.

An example of the system receives code events using XML webservices and stores them in the database and uniformalizes them.

In FIG. 6, at block 601, an elevator controller receives data from sensors and other devices. At block 602, the elevator controller transmits the data to the computing device connected to the controller. At block 603, the computing device receives the data via a network card and then transmits the same to the EMMM server (block 604).

At block 605, the EMMM server obtains the data via the API, and the data is processed and stored in an EMMM format (blocks 606 and 607). The uniformalization includes the EMMM server using a look up table that maps specified codes and data to EMMM codes and data. At block 608, the EMMM server generates a GUI using the EMMM formatted data. At block 609, a user computing device is used to log on to and display the GUI. At block 610, the user computing device detects user input and sends the input to initiate or manage, or both, an action. At block 611, the EMMM server detects this input and then computes a message to the service provider consistent with the input (block 612). This message is transmitted to the service provider server (block 613). The service provider server receives this message and generates a command responsive to the message (blocks 614 and 615).

Any number of various elevator controllers store code events through its connection with the elevator sensors. The code events stored in the manufacturer controller are transmittable to a remote computer via a manufacturer network card. A manufacturer application and API would generally be installed to allow remote access by the user. The manufacturer application and API transmit data to web services application. As noted above, the EMMM server retrieves the data from the network via the web services application. The data is uniformalized and stored. The uniformalized data may be presented through an intuitive web application, such as in the GUI. The end user sees data regarding the code events that have been created by an elevator.

Figure 7:
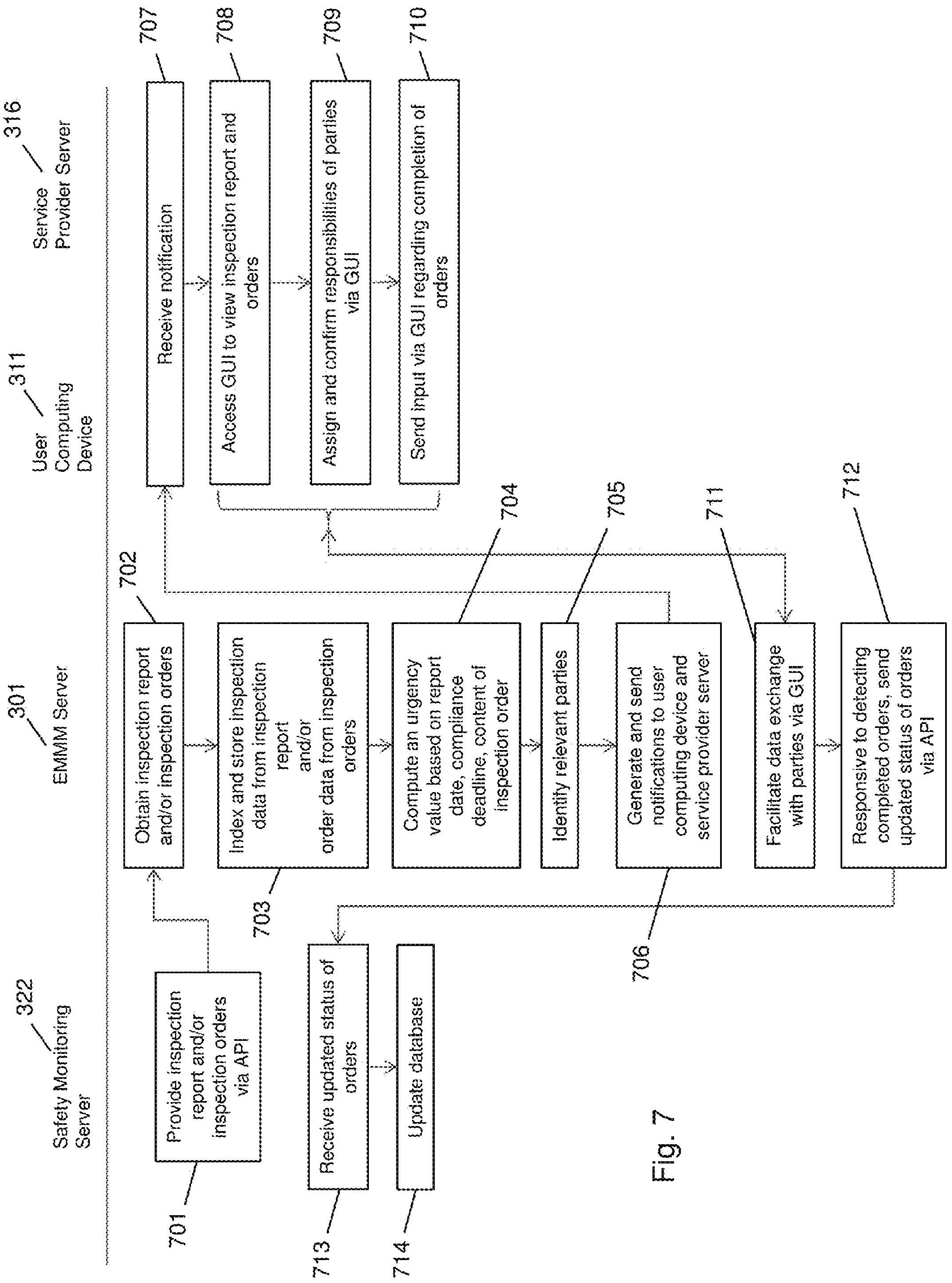
FIG. 7 is a flow diagram of example computer executable instructions for managing inspection orders.

FIG. 7 shows example computer executable instructions for managing an inspection process. At block 701, the safety monitoring server provides an inspection report or inspection orders, or both, via an API. At block 702, the EMMM server obtains the inspection report or inspection orders, or both. At block 703, the EMMM server indexes and stores the inspection data from the inspection or the order data from the inspection orders, or both. The inspection order includes an identifier of the facility owner, the date of inspection, and one or more identifiers of the elevators (e.g. elevator cars A and B in location A). The inspection orders may include an issue date identifying the date at which the order was issued by the safety monitoring server, and a deadline date identifying the deadline at which the order is to be completed. The order may also include a regulation code or regulation identifier that refers to a specific regulation or rule. The order includes text that identifies an action to be performed by the facility owner or the service provider contracted by the facility owner. The text in the order may also include components of the elevator that require repair, monitoring or maintenance. It will be appreciated that the data items in an inspection order or inspection report, or both, may vary from what is described above.

The EMMM processes this data. For example, the data items are itemized and indexed and compared against rules and other values. In another example, the text is analysed using natural language processing to determine actions and relevant components of the elevator system.

At block 704, the EMMM server computes an urgency value based on a number of factors, including one or more of: the date that the report was issued, the compliance deadline date, the current date, and the content of the inspection order. For example, if the compliance deadline is approaching, then the urgency value is higher. If the text content of the inspection order indicates that an action is not critical to the safety or function, then the urgency value is lower. Otherwise, if the text content indicates that an action or a component is critical to the safety and function of the elevator, then the urgency value is higher.

At block 705, the EMMM server identifies the relevant parties and their contact information from a database stored on the EMMM server. At block 706, the EMMM server then generates or compiles notifications, and sends these notifications to the identified parties (e.g. a user computing device of the facility owner, and a server of the service provider).

A number of operations (blocks 707 to 710) may be performed by one of the user computing device 311 and the service provider server 316, or both. These operations include an exchange of data with the EMMM server via a GUI (block 711). In particular, one or both of the user computing device and the service provider server execute the following instructions: receive the notification (block 707); access the GUI to view the inspection report and orders (block 708); assign and confirm responsibilities of parties via the GUI (block 709); and send an input via the GUI regarding completion of orders (block 710). Responsive to the EMMM server detecting the completed orders, the EMMM server sends an updated status of the inspection orders to the safety monitoring server via an API (block 712).

In an example embodiment, the EMMM server sends reminders to the user computing device or the service provider server, or both, if the order status is not completed.

At block 713, the safety monitoring server receives the updated status of the orders and updates its own database (block 714).

With reference to FIGS. 8*a* to 8*c* and to FIGS. 9*a* to 9*c*, example datasets are shown from databases stored in the EMMM server. In FIG. 8*a*, table Activities contains activities having a unique activity id 102, a company id 104, a location id 106 which is tagged to the location of the elevating device, and a device id 108, to identify a unique elevating device. The maintenance information is stored in the form of work description 110, repair description 112, the entered and completion dates 114, 116 and the work order number 118. The invoicing information may be contained as invoice number 120, estimated cost 122 and actual cost 124. The callback information includes a callback id 123, directive code 125, deficiency number 126, government□mandated code 127, counter 128 for the number of occurrences, and billable 129 that determines whether the hours are billable or not.

In FIG. 8*b*, table Activity Labour contains a unique labour id 130, the name of the mechanic 132, the ticket number 134, the hours spent at various rates per hour (regular hour, half hour, overtime and travel hours) 136, as well as time spent at nonbillable activities 138.

In FIG. 8*c*, table Activity Parts provides information on the parts used for the elevator repair. The part id 140 is a unique identifier, and also includes a SKU number 142, OEM field 144, and the name and manufacturer of the part 146, 148, along with quantity of parts 150, description 152 and price 154.

In FIG. 9*a*, table Callbacks includes callback ID 156 for a unique record ID, device ID 158 to uniquely identify a device, a unique call code 160, call code 162, company callback ID 164, company ID 166, information regarding about the problem that occurred such as who entered the problem 168, the date, time and description of the problem 169, dispatch time 170, the call status 171 (including call status and call close time and date), mechanic arrive time 172, information regarding billable hours 174, as well as other information regarding updates of the system 176 such as who updated it or when the update occurred.

In FIG. 9*b*, table Callback Time contains time 178, callback ID 156, dispatch time 170, and mechanic arrive time 172 to determine the responsiveness of the mechanic's call.

In FIG. 9*c*, table Call Codes contains call code 162, a further call code 160 to map the the service provider code with business partner code and uniformalize the data, company ID 166, and part name 182 to produce the call codes.

With reference to FIG. 10*a*, an example of an XML string being transmitted from a computing device 331 connected to a controller, to the EMMM server 301 is shown. In this example, the XML string transmits data on the building ID 185, which is a unique identifier of the building, row ID 186 of the table, the manufacturer ID 187 of the elevating device, the dispatcher ID 188, the car ID 189, a car name 190 for the elevating device, a date stamp 192, an event ID 193 which uniquely identifies the occurrence, along with the floor 195 where the incident occurred, and whether the event was confirmed 196.

In FIG. 10*b*, an example embodiment of data conversion or uniformalization is shown, wherein the data from the XML string is uniformalized into tables of the datastore, in this example of the Building Events Table. The buildingid field is placed into the Building Id field, the manufactureid into the Manufactureld field, and so on.

In FIG. 10*c*, an example of the data types of the Building Events Table is shown. These fields in the table have data restrictions. For example, Building Id is an integer, while RowId is a big integer, and CarId is a small integer and comment is a 255□character field that can hold various characters. In the data conversion process the data from the XML file is received and entered into the fields within the datastore's tables, under the restrictions of the various fields of the tables. Fields may be limited in different ways (such as varchar [127] or int [3]), and where the data does not fit, it is truncated or converted before being inserted into the database. For example, varchar [255] will be truncated to fit varchar [127], and a decimal number will be rounded to fit an integer data slot. In this way, the data is uniformalized into a single database. In an embodiment, inconsistencies of the field naming convention between the XML (representing the manufacturer's specification) and the tables of the datastore are resolved by means of a mapping table, wherein the names used by the XML incoming data are matched to the correct fields of the datastore.

The EMMM server also identifies critical time periods of an elevator and, based on whether or not the current time is within a critical time period, the EMMM server executes different sets of computations. A critical time period for an elevator is a time period during which an elevator is being used frequently by many people. Based on the type building in which a given elevator is located, the date, and other factors, for example, the EMMM server is able to automatically determine the critical time periods for the elevator. For example, the EMMM server uses rules to conclude that, if the building is a business building, then the critical time periods are on the weekdays in the morning hours, the lunch time hours and afternoon hours. If the building is a residential building, then the critical time periods are in the morning hours and the afternoon hours on weekdays.

Figure 11:
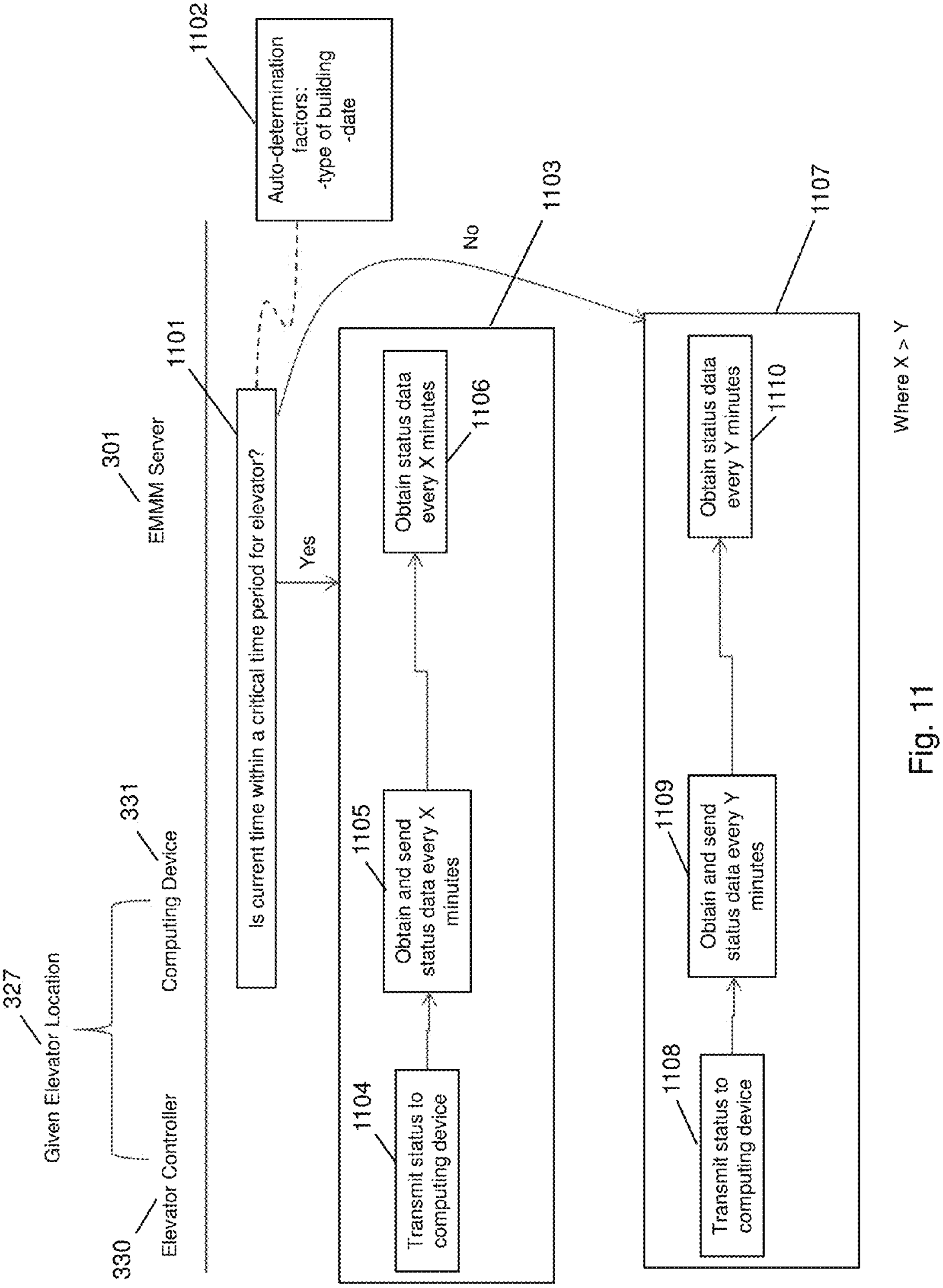
FIG. 11 is a flow diagram of example computer executable instructions for adjusting executable instructions based on a critical time period.

FIG. 11 shows example computer executable instructions for adjusting the executed instructions for the EMMM server 301 or the computing device 331 connected to the controller, based on a critical time period. At block 1101, at least one of the computing device 331 and the EMMM server 301 determine if the current time is within a critical time period for a given elevator. In an example embodiment, the EMMM server automatically determines the critical time periods based on one or more factors, including the type of building, and the current date (block 1102). In another example, the critical time periods may be inputted by a user or modified by a user.

If the current time is within a critical time period, then operations 1103 are executed. These include the elevator controller transmitting status information of the given elevator to the computing device every X minutes (block 1104), the computing device obtaining and sending this information to the EMMM server every X minutes (block 1105), and the EMMM server obtaining the status information from the computing device every X minutes (block 1106). X is a number, and may be a decimal number.

If the current time period is not within a critical time period, then different operation 1107 are executed: blocks 1108, 1109 and 1110. These are similar to blocks 1104, 1105 and 1106, but the data is obtained every Y minutes. Y is a number (e.g. a decimal number) that is less than X. In other words, if the current time is not in a critical time period, then the EMMM server obtains the elevator data less often. While if the current time is in a critical time period, then the EMMM server obtains the elevator data more frequently. In this way, if an error occurred, it would be more quickly reported to the facility owner and the service provider during a critical time period.

Figure 12:
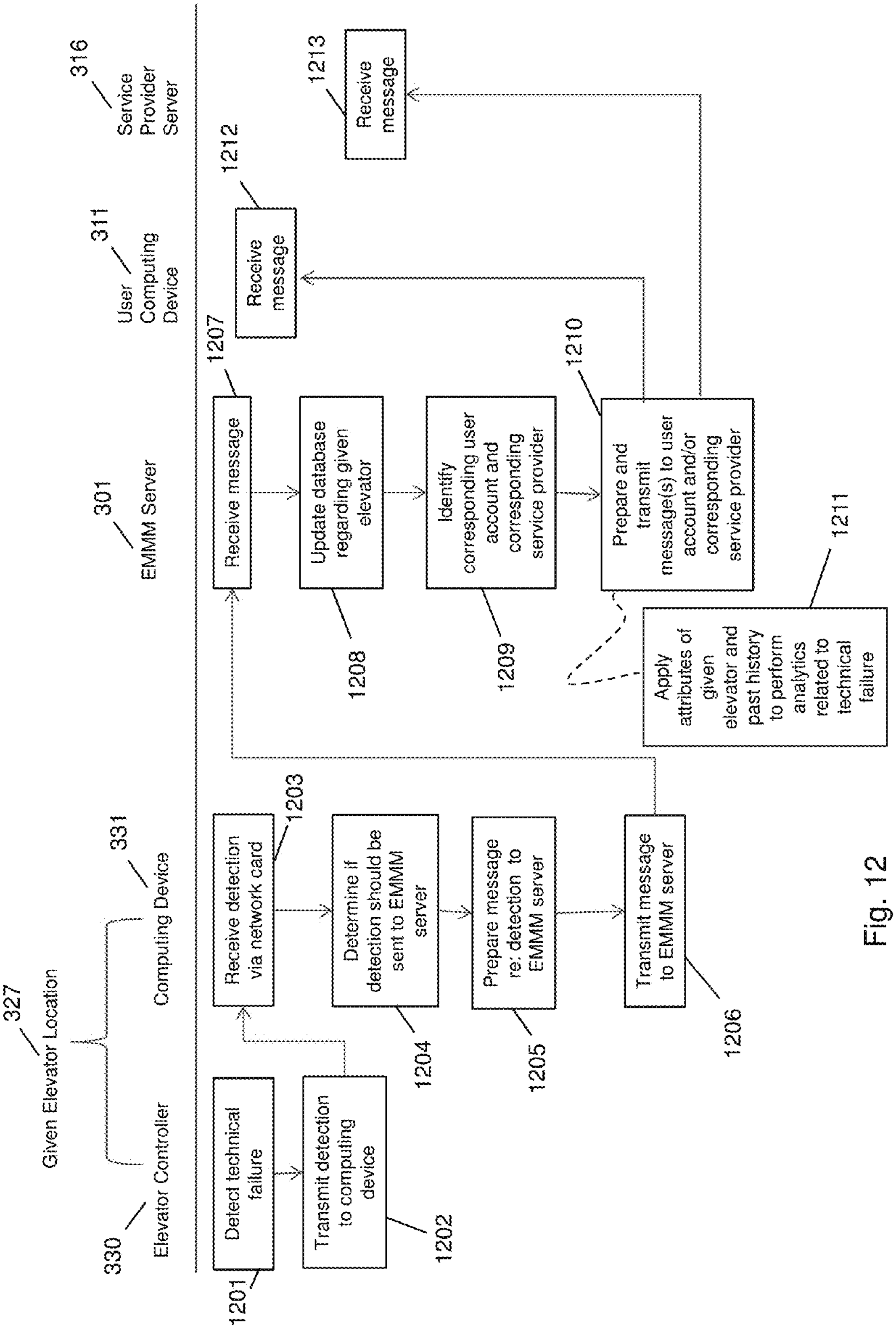
FIG. 12 is a flow diagram of example computer executable instructions for responding to a technical failure of an elevator.

Turning to FIG. 12, example computer executable instructions are provided for transmitting notifications of a technical failure. At block 1201, the elevator controller 330 detects technical failure and then transmits the detection to the computing device 331 (block 1202). The computing device receives the detection via the network card (block 1203) and determines if the detection should be sent to the EMMM server (block 1204). The determination may be made according to one or more different computing algorithms.

If the computing device determines the detection should be sent, then at block 1205 the computing device compiles a message regarding the detection to the EMMM server. The message is transmitted at block 1206.

The EMMM server receives the message (block 1207) and updates the database regarding the given elevator (block 1208). The EMMM server identifies the corresponding user account of the facility owner and the corresponding service provider of the given elevator (block 1209). At block 1210, the EMMM server prepares and transmits one or more messages to the user account (e.g. the user's computing device) and the corresponding service provider (e.g. the service provider's server). At block 1211, the EMMM server may optionally apply attributes of the given elevator, the received message, and the past history of the given elevator to perform analytics related to the technical failure.

At blocks 1212 and 1213, the user computing device 311 and the service provider server 316 respectively receive the message from the EMMM server.

Figure 13:
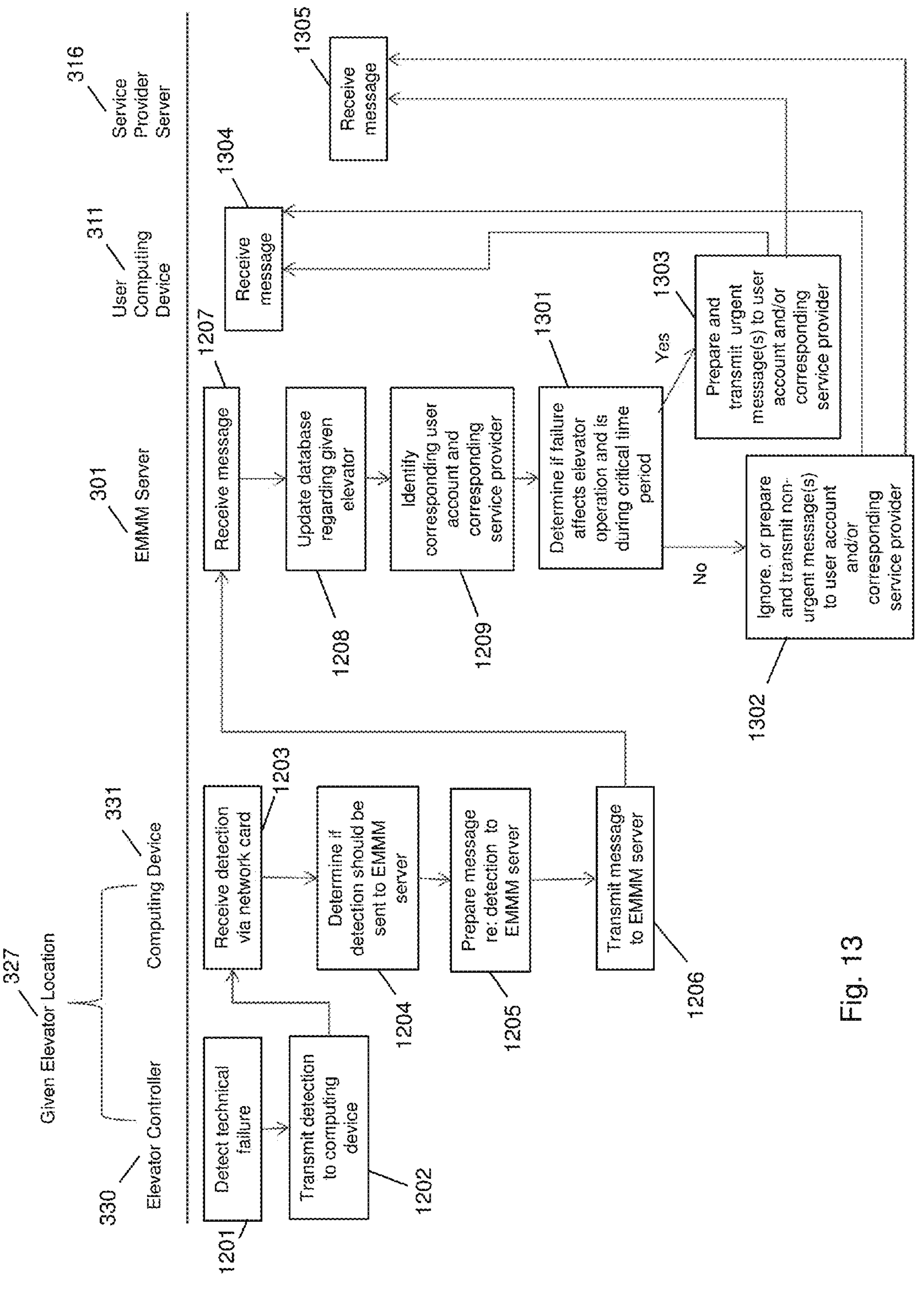
FIG. 13 is a flow diagram of example computer executable instructions for responding to a technical failure of an elevator, in consideration of a critical time period.

FIG. 13 shows example computer executable instructions similar to those in FIG. 13, but the computations consider the critical time period. Operations in blocks 1201 to 1209 are executed. After, at block 1301, the EMMM server determines if the detected failure affects elevator operation during a critical time period. If so, at block 1303, the EMMM server prepares and transmits an urgent message or messages to the user computing device or the service provider server, or both. If not, at block 1302, the EMMM server ignores the message, or prepares and transmits a non-urgent message. The user computing device or the service provider server, or both, receive the messages (blocks 1304 and 1305).

Figure 14:
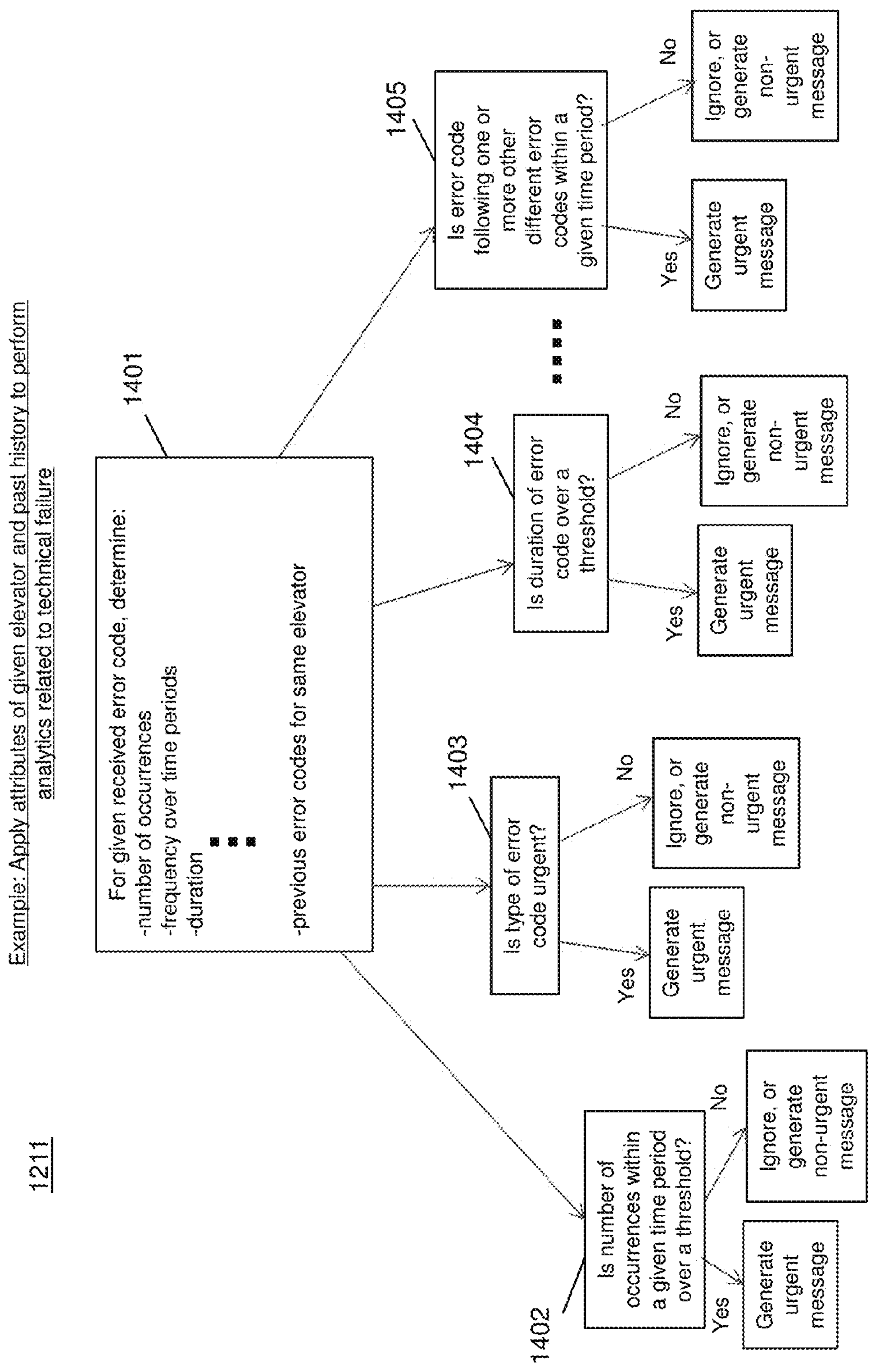
FIG. 14 is a flow diagram of example computer executable instructions for computing analytical algorithms to assess the technical failure.

FIG. 14 shows example computer executable instructions for performing block 1211 to perform analysis of the technical failure.

At block 1401, the EMMM server determines related information about the given error code including: the number of occurrences of the same error code, the frequency of the error code within a given time period, the duration of the error code, and previous error codes for the same elevator. There may be other related information obtained, such as past repairs, related inspection reports and related inspection orders.

At block 1402, the EMMM server determines if the number of occurrences within a given time period is over a threshold. If so, an urgent message is generated.

At block 1403, the EMMM server determines if the type of error code is urgent. If so, an urgent message is generated.

At block 1404, the EMMM server determines if the duration of the error code is over a threshold. If so, an urgent message is generated.

At block 1405, the EMMM server determines if the error code follows one or more different error codes within a given time period. For example, certain combinations of different error codes may reveal an urgent problem, or reveal that the problem is not urgent. If the rule is satisfied, then the EMMM sever generates an urgent message.

It will be appreciated that there may be other rules or conditions that the EMMM server uses to determine whether or not an urgent message should be generated and sent.

FIGS. 15 to 18 show example portions of GUIs generated by the EMMM server.

Figure 15:
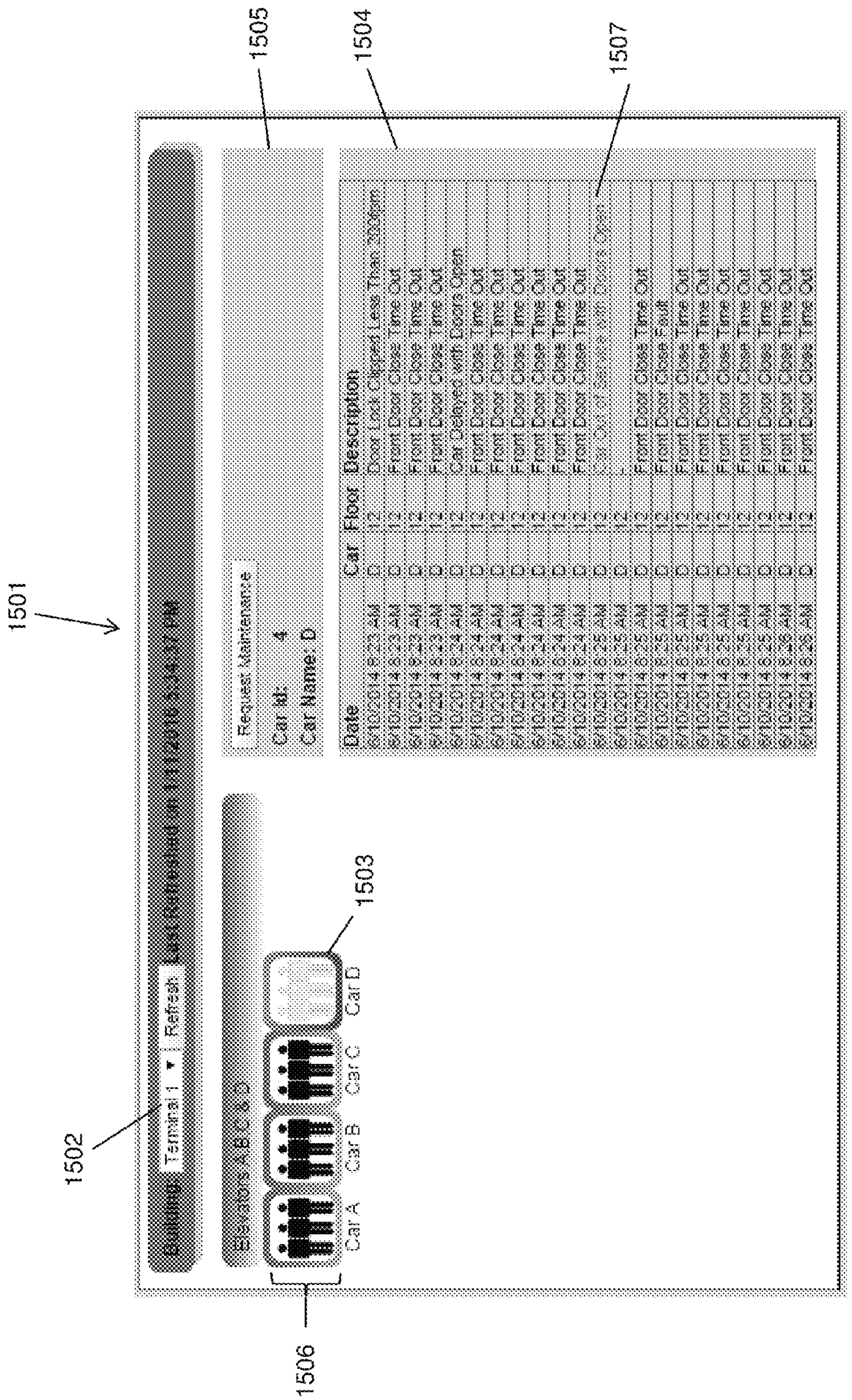
FIG. 15 is a screenshot of an example graphical user interface (GUI) for showing information about elevator cars.

FIG. 15 shows a GUI 1501, or portion thereof, showing details about multiple elevator cars in a building. The control 1502 allows a user to select a certain building. The elevators cars in the selected building are shown as buttons 1506. When one of elevator car buttons are selected, the details of the elevator car are shown in display portions 1505 and 1504. In this example, the button for car D 1503 is shown in a different color or shape to visually indicate that there is an error for car D.

As shown in portion 1505, there is a button that, when selected, initiates automatic compilation of a message to request maintenance of the selected car (e.g. elevator car D). The display, and message should it be compiled, shows the car Id and the car name. The portion 1504 shows a list of events. Each event includes, for example, a date and time stamp, the relevant floor, and the description of the event. The event 1507 in the list that is an error event is shown in a different color or identified by some other visual indicator. For example, the event 1507 indicates that the car is out of service with doors open.

Figure 16:
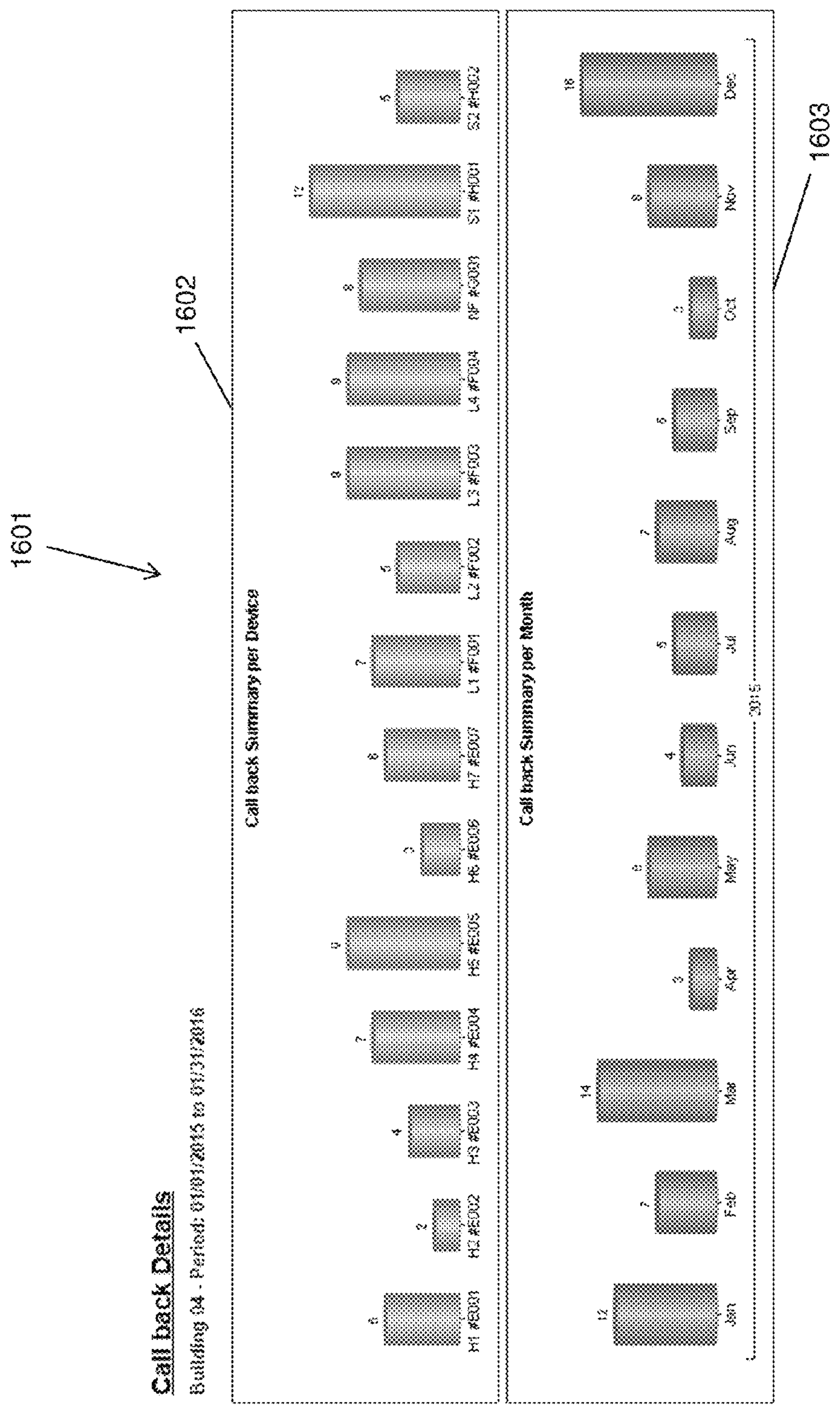
FIG. 16 is a screenshot of an example GUI showing call back details summarized for a facility owner responsible for multiple elevators or escalators, or both.

FIG. 16 shows an example summary of call back details in the GUI 1601, or portion thereof. The GUI includes a graph 1602 showing the number of callbacks made for each lift device. The graph 1603 shows a number of callbacks made per month for all the lift devices belonging to the facility owner.

FIG. 17 shows time period for critical hours and error codes for according to the EMMM format.

FIG. 18 shows a report that includes the history of error codes for a given elevator. For example, elevator H1 #E001 has a total of six call backs: three call backs associated with the ELE error code (e.g. electrical system) and three call backs associated with the GOV error code (e.g. governor/safety). Each error instance shows the date the error code was transmitted, the completion date of the repair, whether or not entrapment occurred, the estimated down time of the given elevator, the description of the error, and the description of the repair.

In an example embodiment, based on the analytics, the EMMM server will automatically recommend repairs, predict maintenance, and identify root problems. These recommendations and automatic analysis may also be presented in the GUI.

FIGS. 19*a* to 19*c*, 20*a*, 20*b*, 21*a*, 21*b* and 22*a* to 22*c* show further examples of XML data from Vendors that is used to encapsulate the maintenance history of an elevating device.

Further example aspects are provided below.

With uniformalization of maintenance and usage data, there is a single sign on. The end user can control callback, allowing the end user to notify different concerned parties, such as owners, service providers, consultants and building tenants, to avoid any unwanted events, as well as send reminders of any kind. Further, uniformalization allows the end user to view information from multiple service providers in one standard presentation, instead of multiple reports in multiple formats. The end user can access information at anytime, providing access to the most recent information on their equipment. Further, information is backed up in the business partner facility. Therefore, the end user can access historical data even after switching service providers. Additionally, backup of data within the business partner's facility provides protection to the end user in the event of a data failure. Having the multiple datasets uniformalized enables the business partner application to analyze datasets, show performance and deficiencies, and send out notifications to the concerned parties.

Other example embodiments and aspects are provided below. In particular, in a general example embodiment of the system and the method, a server (e.g. the EMMM server) obtains code events about a lift device controller via a web services application, the code events being in a first format. The server reformats the code events into a second format using a mapping table, and outputs reformatted code events. The server populates a graphical user interface (GUI) with the reformatted code events, whereby the GUI is accessible by another computing device over the Internet.

In an example aspect, reformatting the code events comprises: selecting a mapping for the code events from a database comprising multiple mappings, the selected mapping selected based on a manufacturer of the lift device, and the database on the server has data restrictions; and converting the code events to match said data restrictions.

In another example aspect, the server receives the code events as part of XML web services data.

In another example aspect, the server obtains data about multiple lift devices associated with a common owner, and the data associated with the multiple lift devices, including the event codes, are shown simultaneously in the GUI.

In another example aspect, the multiple lift devices are located at different locations, and the different locations are shown in the GUI.

In another example aspect, the GUI comprises a control to initiate generating a message, and the operations further include: detecting selection of the control; identifying the lift device currently being selected in the GUI; identifying contact information of a service provider associated with the selected lift device; and automatically compiling the message that includes information about the selected lift device, the message including the contact information.

In another example aspect, automatically compiling the message includes inserting one or more of the event codes associated with the selected lift device.

In another example aspect, the GUI displays information from one or more service providers.

In another example aspect, the operations further include analysing the received event codes to provide an assessment of the lift device.

In another example aspect, the assessment determines an urgency level, and when the urgency level is high, the server sends a message to a user account associated with the lift device.

In another example aspect, the analysing includes comparing the received event codes with past event codes for the same lift device. In another example aspect, the analysing includes identifying a number of the received event codes within a given time period. In another example aspect, the analysing includes identifying a time duration associated with the received event codes. In another example aspect, the assessment includes determining if at least one of the received code events occurred during a critical time period associated with the lift device.

In another example aspect, the operations further include the server receiving an inspection order that includes an identifier of the lift device and a compliance deadline, the inspection order transmittable by a safety monitoring server; in response, the server identifying a user account associated with the lift device; and the server automatically compiling and sending a notification to the user account comprising the inspection order.

In another example aspect, the operations further include the server receiving an input that the inspection order is complete via the GUI; and, in response, the server sending a status message comprising the identifier of the lift device via an application programming interface (API), the status message receivable by the safety monitoring server.

In another example aspect, the lift device is at least one of an elevator and an escalator.

In another general embodiment, a computing process for processing safety data related to one or more lift devices, includes: a server receiving an inspection order via an application programming interface (API) that includes an identifier of a given lift device and a compliance deadline, the inspection order transmittable by a safety monitoring server; in response, the server identifying a user account associated with the given lift device using a database on the server; and the server automatically compiling and sending a notification to the user account comprising the inspection order.

In an example aspect, the server receives an input that the inspection order is complete via a GUI provided by the server; and, in response, the server sends a status message comprising the identifier of the lift device via the API, the status message receivable by the safety monitoring server.

It will be appreciated that different features of the example embodiments of the system and methods, as described herein, may be combined with each other in different ways. In other words, different modules, operations and components may be used together according to other example embodiments, although not specifically stated.

The steps or operations in the flow diagrams described herein are just for example. There may be many variations to these steps or operations according to the principles described herein. For instance, the steps may be performed in a differing order, or steps may be added, deleted, or modified.

The GUIs and screen shots described herein are just for example. There may be variations to the graphical and interactive elements according to the principles described herein. For example, such elements can be positioned in different places, or added, deleted, or modified.

Although the above has been described with reference to certain specific embodiments, various modifications thereof will be apparent to those skilled in the art without departing from the scope of the claims appended hereto.

The invention claimed is:

1. A computer-implemented method for monitoring multiple lift devices, comprising:

a server obtaining code events about different lift device controllers corresponding to the multiple lift devices via a web services application, the code events in multiple different formats corresponding to the different lift device controllers;

the server reformatting the code events into a uniform format using a mapping table, and outputting reformatted code events;

the server populating a graphical user interface (GUI) with the reformatted code events, the GUI accessible by another computing device over the Internet; and wherein reformatting the code events comprises:

selecting a mapping for the code events from a database comprising multiple mappings, the selected mapping selected based on a manufacturer of the lift device, and the database on the server has data restrictions; and converting the code events to match said data restrictions.

2. The method of claim 1 wherein the server receives the code events as part of XML web services data.

3. The method of claim 1 wherein the server obtains data about the multiple lift devices associated with a common owner, and the data associated with the multiple lift devices, including the event codes, are shown simultaneously in the GUI.

4. The method of claim 1 wherein the multiple lift devices are located at different locations, and the different locations are shown in the GUI.

5. The method of claim 1, wherein the GUI comprises a control to initiate generating a message, and the method further comprises: detecting selection of the control; identifying the lift device currently being selected in the GUI; identifying contact information of a service provider associated with the selected lift device; and automatically compiling the message that includes information about the selected lift device, the message including the contact information.

6. The method of claim 5 wherein automatically compiling the message includes inserting one or more of the event codes associated with the selected lift device.

7. The method of claim 1 wherein the GUI displays information from one or more service providers.

8. The method of claim 1 further comprises analysing the obtained event codes to provide an assessment of the lift device.

9. The method of claim 8, wherein the assessment determines an urgency level, and when the urgency level is high, the server sends a message to a user account associated with the lift device.

10. The method of claim 8, wherein the analysing includes comparing the received event codes with past event codes for the same lift device.

11. The method of claim 8, wherein the analysing includes identifying a number of the received event codes within a given time period.

12. The method of claim 8, wherein the analysing includes identifying a time duration associated with the received event codes.

13. The method of claim 1 wherein the server further determines that when a current time is within a critical time period, the server obtains the code events more frequently compared to when the current time is outside the critical time period.

14. The method of claim 1 further comprising the server receiving an inspection order that includes an identifier of the lift device and a compliance deadline, the inspection order transmittable by a safety monitoring server; in response, the server identifying a user account associated with the lift device; and the server automatically compiling and sending a notification to the user account comprising the inspection order.

15. The method of claim 14 further comprising: the server receiving an input that the inspection order is complete via the GUI; and, in response, the server sending a status message comprising the identifier of the lift device via an application programming interface (API), the status message receivable by the safety monitoring server.

16. The method of claim 1 wherein the lift devices include elevators and escalators.

17. A server system for monitoring multiple lift devices, comprising:

a processor for executing instructions;

a communication device for communicating data over the Internet; and memory for storing data and the instructions, the instructions comprising:

obtaining code events about different lift device controllers corresponding to the multiple lift devices via a web services application, the code events in multiple different formats corresponding to the different lift device controllers;

reformatting the code events into a uniform format using a mapping table, and outputting reformatted code events; and populating a graphical user interface (GUI) with the reformatted code events, the GUI accessible by another computing device over the Internet;

wherein reformatting the code events comprises:

selecting a mapping for the code events from a database comprising multiple mappings, the selected mapping selected based on a manufacturer of the lift device, and the database on the server system has data restrictions; and converting the code events to match said data restrictions.

18. The server system of claim 17 wherein the server system receives the code events as part of XML web services data.

19. The server system of claim 17 wherein the server system obtains data about the multiple lift devices associated with a common owner, and the data associated with the multiple lift devices, including the event codes, are shown simultaneously in the GUI.

20. The server system of claim 17 wherein the multiple lift devices are located at different locations, and the different locations are shown in the GUI.

21. The server system of claim 17, wherein the GUI comprises a control to initiate generating a message, and the instructions further comprise: detecting selection of the control; identifying the lift device currently being selected in the GUI; identifying contact information of a service provider associated with the selected lift device; and automatically compiling the message that includes information about the selected lift device, the message including the contact information.

22. The server system of claim 21 wherein automatically compiling the message includes inserting one or more of the event codes associated with the selected lift device.

23. The server system of claim 17 wherein the GUI displays information from one or more service providers.

24. The server system of claim 17 wherein the instructions further comprise analysing the obtained event codes to provide an assessment of the lift device.

25. The server system of claim 24, wherein the assessment determines an urgency level, and when the urgency level is high, the server sends a message to a user account associated with the lift device.

26. The server system of claim 24, wherein the analysing includes comparing the received event codes with past event codes for the same lift device.

27. The server system of claim 24, wherein the analysing includes identifying a number of the received event codes within a given time period.

28. The server system of claim 24, wherein the analysing includes identifying a time duration associated with the received event codes.

29. The server system of claim 17 wherein the instructions further comprise determining that when a current time is within a critical time period, the server obtains the code events more frequently compared to when the current time is outside the critical time period.

30. The server system of claim 17 wherein the instructions further comprise receiving an inspection order that includes an identifier of the lift device and a compliance deadline, the inspection order transmittable by a safety monitoring server; in response, the server system identifying a user account associated with the lift device; and the server system automatically compiling and sending a notification to the user account comprising the inspection order.

31. The server system of claim 30 further comprising: the server receiving an input that the inspection order is complete via the GUI; and, in response, the server sending a status message comprising the identifier of the lift device via an application programming interface (API), the status message receivable by the safety monitoring server.

32. The server system of claim 17 wherein the lift devices include elevators and escalators.

* * * * *